US011883692B2

(12) United States Patent
Miller et al.

(10) Patent No.: US 11,883,692 B2
(45) Date of Patent: Jan. 30, 2024

(54) TOP BRACKET FOR FALL PROTECTION SAFETY SYSTEM

(71) Applicant: 3M INNOVATIVE PROPERTIES COMPANY, St. Paul, MN (US)

(72) Inventors: Rick G. Miller, Prescott, WI (US); Keith G. Mattson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 520 days.

(21) Appl. No.: 17/161,066

(22) Filed: Jan. 28, 2021

(65) Prior Publication Data

US 2021/0146172 A1 May 20, 2021

Related U.S. Application Data

(63) Continuation of application No. 15/733,190, filed as application No. PCT/US2018/066180 on Dec. 18, 2018, now Pat. No. 10,940,338.

(60) Provisional application No. 62/607,409, filed on Dec. 19, 2017.

(51) Int. Cl.

| | |
|---|---|
| ***A62B 35/00*** | (2006.01) |
| ***E06C 7/18*** | (2006.01) |
| ***A62B 35/04*** | (2006.01) |

(52) U.S. Cl.

CPC ........ *A62B 35/0068* (2013.01); *A62B 35/005* (2013.01); *E06C 7/186* (2013.01); *A62B 35/04* (2013.01); *E06C 7/187* (2013.01)

(58) Field of Classification Search

CPC ... A62B 35/0068; A62B 35/005; A62B 35/04; E06C 7/186; E06C 7/187

See application file for complete search history.

(56) References Cited

U.S. PATENT DOCUMENTS

| | | | | |
|---|---|---|---|---|
| 1,630,484 A | | 10/1924 | Fritts | |
| 3,598,200 A | | 8/1971 | Thompson | |
| 3,908,791 A | | 9/1975 | Kleine | |
| 4,512,438 A | * | 4/1985 | Vilchek .................... | A62B 1/12 182/238 |
| 4,709,783 A | | 12/1987 | Tomioka | |

(Continued)

FOREIGN PATENT DOCUMENTS

| | | |
|---|---|---|
| CA | 2181858 | 1/1998 |
| EP | 2 826 947 A1 | 1/2015 |

(Continued)

OTHER PUBLICATIONS

Extended EP Search Report for EP 18 89 2803, dated Sep. 17, 2021 (2 pages).

(Continued)

*Primary Examiner* — Brian D Mattei
*Assistant Examiner* — Omar F Hijaz
(74) *Attorney, Agent, or Firm* — Kenneth B. Wood

(57) ABSTRACT

A top bracket for supporting a safety cable of a vertical climbing fall protection system, the bracket including a base plate and a pivotally deflectable plate that is integrally and pivotally connected to the base plate by a neck. The top bracket may also include an abutment plate with a forward abutment surface that is separated from a rearward abutment surface of the pivotally deflectable plate by an elongate gap.

19 Claims, 9 Drawing Sheets

(56) References Cited

U.S. PATENT DOCUMENTS

| | | | | | |
|---|---|---|---|---|---|
| 5,316,102 | A * | 5/1994 | Bell | E04G 5/045 182/191 |
| 5,580,115 | A | 12/1996 | Jessen | |
| 5,638,919 | A * | 6/1997 | Pejout | A62B 35/04 182/5 |
| 5,855,251 | A | 1/1999 | Deuer | |
| 6,107,575 | A | 8/2000 | Miranda | |
| 6,457,556 | B1 * | 10/2002 | Skade | A62B 35/04 188/371 |
| 8,127,904 | B2 * | 3/2012 | Muska | E04H 9/022 267/136 |
| 8,517,324 | B2 | 8/2013 | Auger | |
| 8,550,225 | B2 * | 10/2013 | Blomberg | F16F 7/128 188/371 |
| 8,776,948 | B2 | 7/2014 | Svehlek | |
| D710,678 | S * | 8/2014 | Miller | D8/356 |
| 8,875,839 | B1 | 11/2014 | Licea | |
| 9,168,402 | B2 * | 10/2015 | Casebolt | A62B 1/14 |
| 9,662,518 | B1 | 5/2017 | Lay | |
| 9,687,683 | B2 | 6/2017 | Jones | |
| 9,750,959 | B2 | 9/2017 | Sepe | |
| 10,137,323 | B2 * | 11/2018 | Roth | A62B 35/0062 |
| 2008/0236010 | A1 | 10/2008 | Levin | |
| 2010/0012424 | A1 * | 1/2010 | Krauss | A62B 35/04 182/3 |
| 2013/0168528 | A1 | 7/2013 | Patton | |
| 2014/0020983 | A1 * | 1/2014 | Casebolt | A62B 35/0081 182/241 |
| 2016/0059055 | A1 | 3/2016 | Roth | |
| 2017/0260762 | A1 | 9/2017 | Ostrobrod | |
| 2019/0169934 | A1 | 6/2019 | Adams | |
| 2019/0201724 | A1 | 7/2019 | Turcotte | |
| 2019/0338593 | A1 | 11/2019 | Knickrehm | |

FOREIGN PATENT DOCUMENTS

| | | | |
|---|---|---|---|
| FR | 2808695 | A1 | 11/2001 |
| JP | 2000- I 07305 | | 4/2000 |
| WO | WO 2005/044384 | | 5/2005 |
| WO | WO 2015/185725 | | 12/2015 |
| WO | WO 2017/030558 | | 2/2017 |

OTHER PUBLICATIONS

LAD-SAF, Globally Approved Vertical Fall Arrest System, Capital Safety Group, 2010, 4 pages.

LAD-SAF, Installation Instructions, Flexible Cable Ladder Safety Systems, ® 2016, 3M, 24 pages.

LAD-SAF, Product Specification, Flexible Cable Ladder Safety Systems, © 2013, Capital Safety, 7 pages.

Trylon, User Installation and Instruction Manual, Cougar Safety Cable, Manual #4.957.0000.R02, 2012, 22 pages.

International Search Report for PCT International Application No. PCT/US2018/066180, dated Apr. 9, 2019, 3 pages.

* cited by examiner

TOP BRACKET FOR FALL PROTECTION SAFETY SYSTEM

CROSS REFERENCE TO RELATED APPLICATIONS

This application is a continuation of U.S. application Ser. No. 15/733,190, filed Jun. 8, 2020, now allowed, which is a national stage filing under 35 U.S.C. 371 of PCT/US2018/066180, filed Dec. 18, 2018, which claims the benefit of U.S. Provisional Patent Application No. 62/607,409, filed Dec. 19, 2017, the disclosures of which are incorporated by reference in their entirety herein.

BACKGROUND

Vertical climbing fall protection systems are often used to enhance worker safety e.g. when climbing, descending, or otherwise using a climbing facility (e.g. a ladder) in the course of constructing or servicing telecommunication towers, water towers, distillation towers, smokestacks, wind turbines, oil rigs, cranes, or any elevated (or descending) structure.

SUMMARY

In broad summary, herein is disclosed a top bracket for supporting a safety cable of a vertical climbing fall protection system. In one aspect, the top bracket comprises a base plate and a pivotally deflectable plate that is integrally and pivotally connected to the base plate by a neck. In another aspect, the top bracket may comprise an abutment plate with a forward abutment surface that is separated from a rearward abutment surface of the pivotally deflectable plate by an elongate gap. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
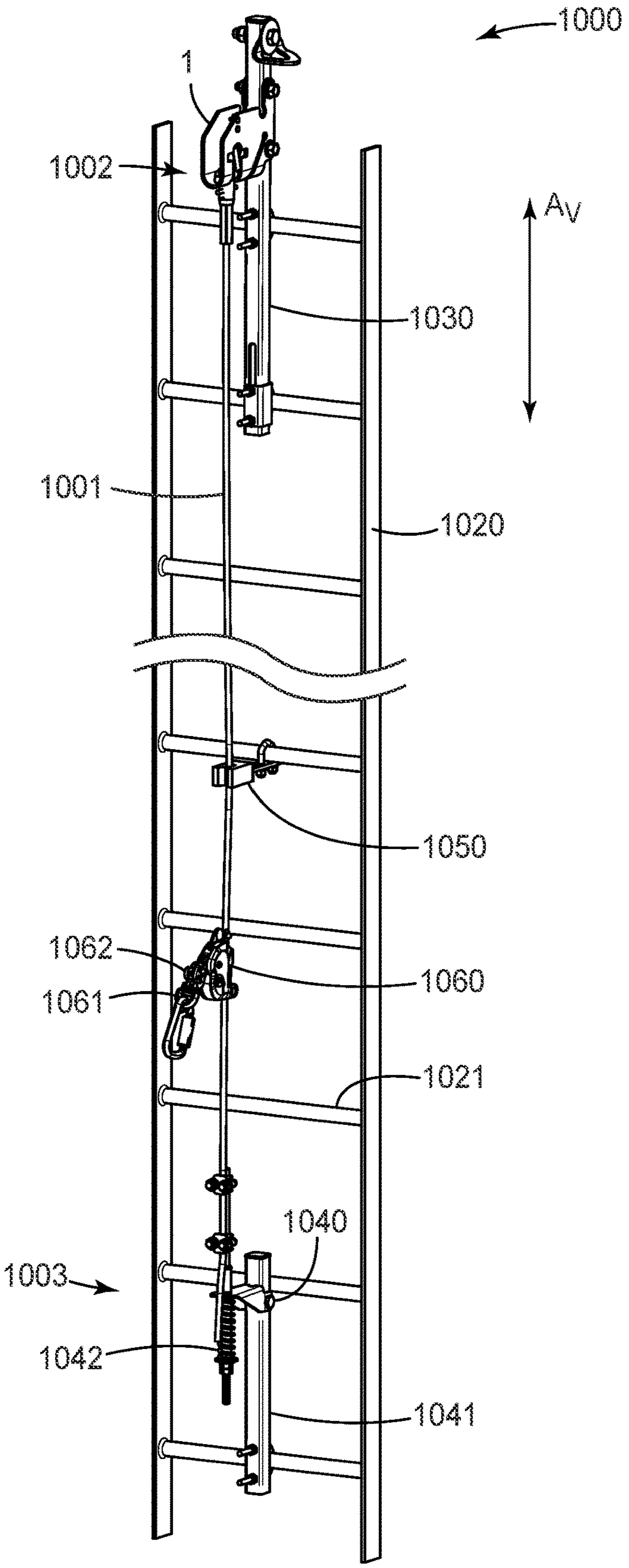
FIG. 1 is a front perspective view of an exemplary ladder fitted with an exemplary vertical climbing fall protection system.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not necessarily to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as first and second may be used in this disclosure, it should be understood that those terms are used in their relative sense only unless otherwise noted. Terms such as vertical, horizontal, above, below, upper, lower, and so on, have their ordinary meaning with respect to the Earth, unless otherwise noted in any specific instance.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 30 degrees. The term "substantially", unless otherwise specifically defined, means to a high degree of approximation (e.g., within +/−10% for quantifiable properties). For angular orientations, the term "substantially" means within clockwise or counterclockwise 10 degrees. The term "essentially" means to a very high degree of approximation (e.g., within plus or minus 2% for quantifiable properties; within plus or minus 2 degrees for angular orientations); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a top bracket for use in a vertical climbing fall protection safety system. As shown in exemplary embodiment in FIG. 1, such a safety system often comprises at least a top bracket 1, a bottom bracket 1040, and a safety cable 1001, as discussed in further detail later herein. Often, top bracket 1 is attached to a rail 1030, which is attached to, or is a part of, a secure support (e.g. a permanently installed ladder). An upper end 1002 of safety cable 1001 is connected to top bracket 1, so that top bracket 1 supports the safety cable.

Figure 2:
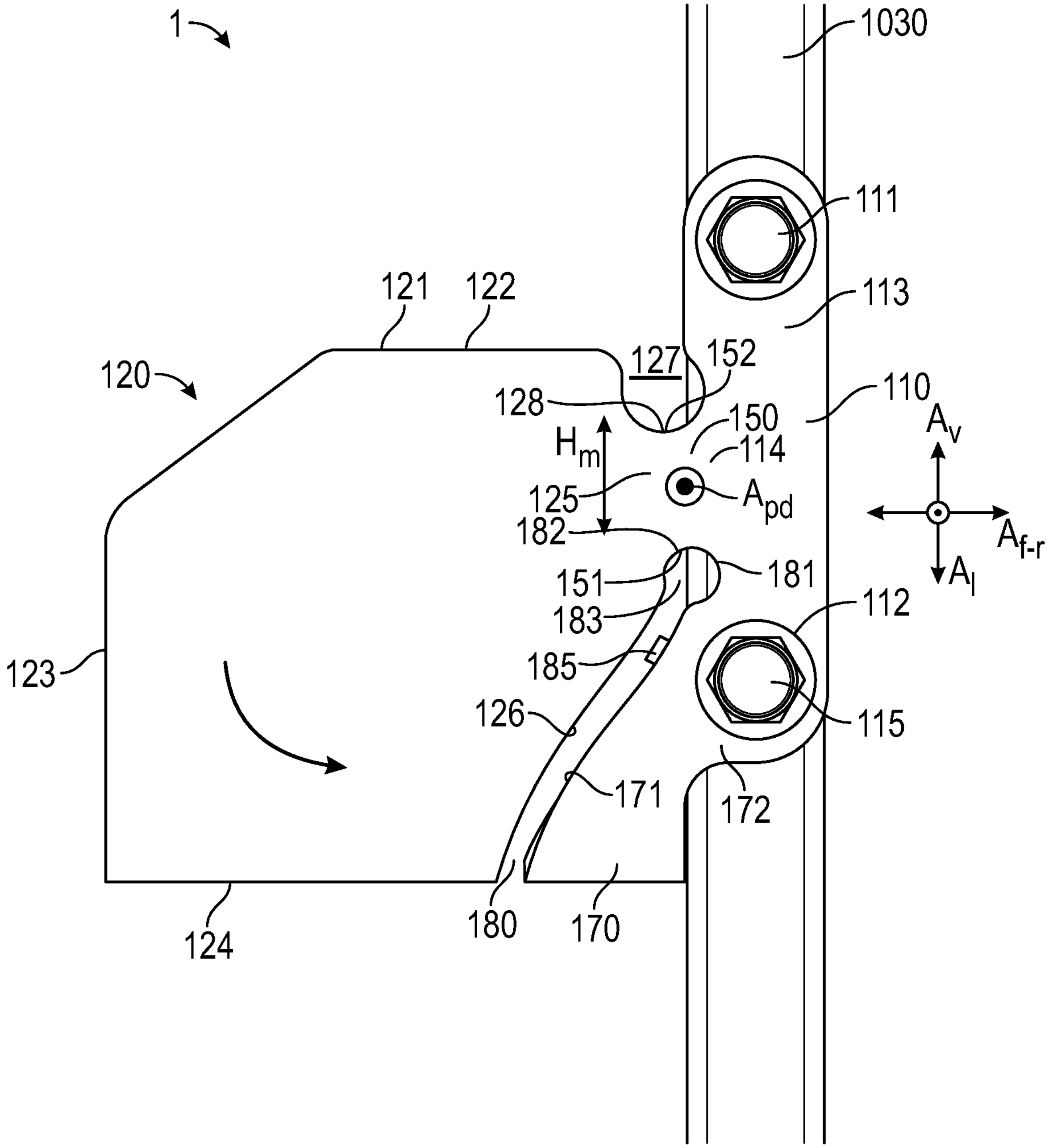
FIG. 2 is a side view of an exemplary top bracket suitable for use in a vertical climbing fall protection system.

An exemplary top bracket 1 as disclosed herein is shown in side view in FIG. 2. As indicated by the axes in FIG. 2, top bracket 1 comprises a vertical axis $A_v$ and a forward-rearward axis $A_{f\text{-}r}$, in which the forward and rearward directions are respectively away from and toward a rail 1030 to which the top bracket is attached. Top bracket 1 also comprises a lateral (transverse) axis Ai which is oriented at least generally orthogonally to the forward-rearward axis $A_{f\text{-}r}$. The forward-rearward axis $A_{f\text{-}r}$ and the lateral axis Ai of top bracket 1 will typically be oriented at least generally horizontally.

Top bracket 1 comprises at least one unitary, integral body that includes at least a base plate 110 and a pivotally deflectable plate 120 that extends at least generally forwardly from base plate 110. By a unitary, integral body is meant that base plate 110 and pivotally deflectable plate 120 are portions of a single piece of material (e.g. a single steel plate) rather than being parts that are made separately and are then assembled together to form the top bracket. Base plate 110 is configured to be attached to a rail 1030 in any suitable manner, e.g. by way of a first bolt 111 positioned in an upper portion 113 of base plate 110, and a second bolt 115 positioned in a lower portion 112 of base plate 110. As noted, pivotally deflectable plate 120 extends at least generally forwardly from base plate 110 and comprises a forward boundary (e.g. edge) 123. Plate 120 also comprises an upper boundary 121 and a lower boundary 124 that collectively define a vertical height of pivotally deflectable plate 120. Plate 120 may exhibit a maximum vertical height somewhere along the forward-rearward extent of plate 120. (In the design of FIG. 2, this maximum height is the vertical distance between upper edge 121 and lower edge 124.) Plate 120 may be beveled to any desired amount at its forward-upper corner (e.g. as in FIG. 2) if desired.

Pivotally deflectable plate 120 is configured to extend at least generally forwardly from base plate 110 by way of a neck 150 that connects plate 120 to base plate 110. Neck 150 is unitary and integral with base plate 110 and pivotally deflectable plate 120; neck 150 meets deflectable plate 120 at a junction 125 and meets base plate 110 at a junction 114. Neck 150 comprises an upper edge 152 and a lower edge 151 that, at any location along the forward-rearward extent of neck 150, collectively define a vertical height of neck 150. By definition, neck 150 exhibits a minimum vertical height ($H_m$ in FIG. 2) at some point along the forward-rearward extent of neck 150, that is no greater than about 40% of the maximum vertical height of pivotally deflectable plate 120. In various embodiments, the minimum vertical height of neck 150 may be no greater than about 35, 30, 25, 20, or 15% of the maximum vertical height of pivotally deflectable plate 120. (In the exemplary embodiment of FIG. 2, the minimum vertical height of neck 150 is approximately 20% of the maximum vertical height of plate 120.) In many embodiments, neck 150 will be the only item that supports pivotally deflectable plate 120. For example, plate 120 will typically be cantilevered (i.e. unsupported at its forward end), as shown in FIG. 2.

Top bracket 1 supports an upper end 1002 of a safety cable 1001 as shown in exemplary embodiment in FIG. 1. Specifically, upper end 1002 of cable 1001 is connected to a pivotally deflectable plate or plates 120 of top bracket 1, as discussed in detail later herein. Top bracket 1 can be made of any material (e.g. metal) that exhibits suitable strength, stiffness and durability. In particular embodiments, top bracket 1 may be made of steel, e.g. stainless steel such as grade 304 steel, galvanized steel, or the like. Even though top bracket 1 will be made of a material (e.g. steel) conventionally considered to be very stiff and unyielding, the design of top bracket 1 allows plate 120 to pivotally deflect upon the application of sufficient downward force to plate 120 (for example, in the event that safety cable 1001 is called on to support a significant portion of the weight of a worker).

By pivotally deflectable is meant that plate 120 can move at least generally downwardly and rearwardly (as indicated by the curved arrow in FIG. 2) about an axis of pivotal deflection $A_{pd}$ that passes at least generally through neck 150. The arrangements disclosed herein (in which plate 120 is made pivotally deflectable by being connected to a base plate by a neck) provide that any deflection of plate 120 will occur primarily by way of plate 120 rotating bodily (as a whole) about axis $A_N$, i.e. with little or no deformation of plate 120 itself. Axis $A_{pd}$ may be at least somewhat non-localized (spread) generally over an area of neck 150; it will be understood that such an axis may not necessarily fall at the exact location indicated by the symbol $A_{pd}$ in FIG. 2. (In other words, the indication of axis $A_{pd}$ in FIG. 2 is an idealized representation for convenience of description.) It will also be appreciated that in many instances, the rotation of plate 120 about axis $A_{pd}$ in response to a downward force on plate 120 may be relatively small, e.g. less than 5, 4, 2 or even 1 angular degree, as will be understood from discussions herein. It will thus be appreciated that a neck 150, comprising an axis of pivotal deflection as disclosed herein, is distinguished from e.g. a conventional hinged connection (whether two-part, or a living hinge) that allows a large range of unhindered rotational movement. Axis $A_{pd}$ will typically be oriented at least generally horizontally and/or at least generally parallel to lateral axis Ai of top bracket 1.

An arrangement in which a safety cable of a vertical climbing safety system is supported by a plate that is pivotally deflectable as described herein can provide significant advantages. Namely, the material of top bracket 1 (e.g. steel) can be chosen, along with the dimensions and geometric parameters of pivotally deflectable plate 120, neck 150, and base plate 110, so that top bracket 1 is appropriately strong to withstand forces such as e.g. static loads resulting from the weight of a worker, dynamic loads resulting from a worker fall, and so on. However, rather than top bracket 1 being configured so that plate 120 will remain essentially immobile even upon the application of a downward force to plate 120, the above-mentioned parameters may be chosen to allow plate 120 to pivotally deflect downward (and slightly rearward) upon the application of a sufficiently large downward force. As noted above, this can provide significant advantages.

Specifically, although many vertical climbing safety systems use a cable sleeve 1060 with a connection (e.g. to a worker's harness) 1061 that includes a shock absorber 1062 as indicated in exemplary embodiment in FIG. 1, such a shock absorber is configured primarily to reduce the force that is experienced by a worker in the course of arresting a worker fall. In other words the primary purpose of such a shock absorber is to protect the worker, not necessarily to protect the equipment (e.g. a ladder) being used by the worker. So, for example, if a top bracket of such a safety system is so stiff (e.g. immobile) so as to transmit an essentially unattenuated force to a rail to which the top bracket is attached, the rail may then transmit this force, again essentially unattenuated, to an item (such as a rung 1021 of a ladder 1020) to which the rail is attached. This may result in damage or wear to the ladder (and/or to the rail).

In the present disclosure, top bracket 1 is configured so that a force transmitted by a safety cable to plate 120 (e.g. in the event of a worker fall) can cause plate 120 to pivotally deflect slightly downward and rearward into a deflected configuration. This can at least somewhat attenuate any force that is transmitted through top bracket 1 to a rail 1030 and thus to an item to which the rail is attached. Such an arrangement can advantageously reduce any damage or wear to the item and/or to the rail.

Top bracket 1 (e.g. neck 150 thereof) can be configured so that a force that is below a chosen threshold does not cause the material of neck 150 to be stressed beyond its elastic limit. In other words, the stress experienced by the material of neck 150 will remain below an amount that could cause permanent deformation of the material. This can provide that essentially no permanent (e.g. plastic) deformation of neck 150, or of any portion of top bracket 1, occurs upon the top bracket encountering a force that is below the chosen threshold. Top bracket 1 will thus return to its original condition (i.e. with plate 120 in a non-deflected configuration) after the downward force is removed. Thus, top bracket 1 may be able to undergo a number of events such as e.g. worker fall-arrests without being affected (e.g. undergoing permanent deformation) to the point that top bracket 1 needs replacing. Top bracket 1 as disclosed herein is thus distinguished from a vertical climbing fall protection top bracket that is configured e.g. for one-time fall-arrest use only.

Top bracket 1 may be configured so that if force is encountered that is above the chosen threshold, the pivotal deflection of plate 120 may cause the material of neck 150 to exceed its elastic limit, thus causing some (e.g. small) amount of permanent deformation. This may cause plate 120 to remain in its deflected configuration, or at least to not return fully to its original undeflected configuration, after the force is removed. In consideration of this, in some embodiments top bracket 1 may comprise an abutment plate 170 that extends forwardly from a lower portion 112 of base plate 110 (in FIG. 2, the junction of abutment plate 170 with base plate 110 is indicated as location 172). Abutment plate 170 and pivotally deflectable plate 120 may be configured so that a gap 180 is present between a rearward edge 126 of plate 120 and a forward edge 171 of abutment plate 170. Any permanent change (e.g. downward-rearward deflection) in the position of plate 120 may thus be manifested as a change (i.e. a narrowing) in the width of gap 180. Thus, visual inspection of gap 180 (whether e.g. at a chosen point of gap 180, along a segment of its length, or along most of its length) can ascertain whether top bracket 1 has been exposed to a force above the chosen threshold and thus needs to be replaced. Such a condition may be met, for example, the width of gap 180 has been found to have become narrowed to less than e.g. 80, 60, 40, or 20 percent of its original value, at at least some location along gap 180. Detailed instructions may be provided to workers as to exactly how to assess the value of the gap width and how to determine if a gap width is present that is indicative of need for replacement of the top bracket.

In some embodiments, gap 180 may be elongate as in the exemplary illustration of FIG. 2. In some such embodiments, the local gap width (i.e., the shortest distance between rearward edge 126 of plate 120 and forward edge 171 of abutment plate 170) may be at least generally, substantially, or essentially uniform along at least about 20, 40, 60, 70, 80, or 90% of the elongate length of gap 180. Such arrangements may allow easy visual inspection of whether the magnitude of the gap has changed at any particular location along the gap. Such inspection might involve e.g. ascertaining the absolute magnitude of the gap width at one or particular locations, or comparison of the gap width at different locations along the elongate length of the gap. In some embodiments elongate gap 180 may be relatively linear e.g. as in the exemplary design of FIG. 2. Such a design may allow inspection of, for example, whether the gap width at a location distal to axis of pivotal deflection $A_{pd}$ has decreased in comparison to the gap width at a location proximal to the axis of pivotal deflection.

Any evidence that any portion of gap 180 has permanently narrowed may be taken as an indication that permanent deformation of top bracket 1 has occurred and that replacement of top bracket 1 may be appropriate. While visual inspection may be conveniently performed, in some optional embodiments top bracket 1 may be equipped with one or more sensors (e.g. optical sensors) 185 that can monitor the gap width. Such a sensor or sensors may, for example, report whether the gap width has permanently changed, and/or may report the number of events in which the gap width momentarily changed but (the force being insufficient to exceed the elastic limit of the material of neck 150) that did not result in any permanent deformation. In some embodiments, one or more force indicators may be inserted at least partially into gap 180. Such a force indicator might be e.g. any device (e.g. made of molded plastic) with one or more features that are irreversibly crushable, friable, or the like, when subjected to a sufficient force. Such a force indicator may enhance the ease with which gap 180 may be visually inspected for evidence of a force having been encountered that might make it appropriate to replace top bracket 1.

In general, any sensor of any suitable type and mode of operation may be optionally used in order to provide an indication of the condition of top bracket 1 and/or any component associated therewith. In some embodiments, such a sensor may comprise at least one strain gauge configured to, for example, monitor and report any deflection of pivotally deflectable plate 120. In some embodiments, such a sensor may comprise at least one camera that can, for example, obtain one or more images that provide an indication of whether pivotally deflectable plate 120 has deflected to the extent that any portion of gap 180 has permanently narrowed, whether a force indicator provided in gap 180 has been triggered, and so on.

In some embodiments, any such sensor may be configured to transmit this indication to a remote unit (e.g. a smartphone or the like) so that it is not necessary that the top bracket be visited in person to receive the indication. Thus in some embodiments such a camera (or, in general, any suitable sensor) may be provided as part of a sensing module that includes a transmitter (e.g. operating by Bluetooth or similar mechanism) by which the data obtained by the sensor can be transmitted to a remote unit. In particular embodiments in which one or more cameras are used, the one or more cameras may also provide an indication of the status of other components of the system (e.g. it may confirm that a fitting at the upper end of a safety cable is properly seated in top bracket 1). In some embodiments such a sensing module may be a battery-powered unit, e.g. configured so that it is maintained in passive or sleep mode until such time as contacted by a remote unit, at which time it may then obtain and transmit images of the top bracket. It will be appreciated that many such uses (e.g. at the top of a tower or other elevated, outdoor entity) will involve a harsh environment. Thus, to serve in such an application, any such sensor, sensing module, or the like, would have to be able to survive prolonged exposure to, for example, temperature extremes, sunlight, rain, snow, sleet, hail, wind, storms, and so on.

In various embodiments, an elongate gap 180 between pivotally deflectable plate 120 and abutment plate 170 may exhibit a long axis. Such a long axis may be oriented at any suitable angle. For example, such a long axis may be oriented, on average, from at least about 0, 10, 20, or 30 degrees of the vertical axis of top bracket 1, to at most about 90, 80, 70, 60 or 50 degrees relative to the vertical axis of top bracket 1. In the case of an elongate gap that is arcuate in shape, this average orientation angle may be the average of angles chosen at e.g. five locations that are evenly spaced along the elongate length of the gap. By way of a specific example, the elongate gap 180 as depicted in FIG. 2, which is generally linear (but with a slight but noticeable inflection), is estimated to be oriented at an average angle of approximately 30 degrees relative to the vertical axis of top bracket 1.

In some embodiments abutment plate 170 may serve at least one additional purpose. For example, in the event of an even higher force being applied to pivotally deflectable plate 120, plate 120 may pivotally deflect to such an extent that at least a portion of rearward edge 126 of plate 120 may come into contact with at least a portion of forward edge 171 of abutment plate 170. In other words, in such an instance, at least a portion of gap 180 may be completely closed (in the exemplary design of FIG. 2, this would be expected to occur first at the lower end of gap 180.) In consideration of this, forward edge 171 of abutment plate 170 may serve as an abutment surface that, when contacted by complementary rearward abutment surface 126 of plate 120, may bear a significant portion of the force that is encountered by plate 120. This can allow neck 150 to be configured so that plate 120 is downwardly deflectable even by a relatively low downward force, while providing that the overall strength of top bracket 1 is ample to withstand even a relatively high downward force.

As noted above, in some embodiments elongate gap 180 may be relatively linear e.g. as in the exemplary embodiment of FIG. 2. In some embodiments, elongate gap 180 may be arcuate over at least a portion of its elongate length and/or the gap width may increase with the distance from axis of pivotal deflection A. Such arrangements may be used e.g. if it is desired that the application of a large force to pivotally deflectable plate 120 will cause abutment surface 126 of plate 120 to contact abutment surface 171 of abutment plate 170 along a significant portion of the elongate length of gap 180.

In brief summary, the above discussions reveal that a top bracket of a vertical climbing safety system can be arranged so that a safety cable of the system is connected to an item (i.e. a deflectable plate 120) that can reversibly deflect upon one or more applications of a relatively small force. This can save wear and tear on an item (e.g. a ladder) to which the top bracket is attached and can also allow the top bracket to be re-used after a number of small-force events. However, the top bracket possesses ample strength to withstand a higher-force event. Furthermore, the top bracket is configured so that visual inspection can reveal evidence that a higher-force event has occurred, so that the top bracket can be replaced if necessary.

By definition, at least pivotally deflectable plate 120 and neck 150 (and, in many embodiments, base plate 110 and abutment plate 170) are vertically oriented. By this is meant that for each of these components the lateral direction is the direction of shortest dimension. Specifically, these components each exhibit a maximum height (at some location along the forward-rearward extent of the item) that is at greater than the average lateral extent (width) of the item by a factor of at least about 3. In various embodiments, the maximum height of neck 150 may be greater than the average lateral width of neck 150 by a factor of at least about 4, 5, or 6. In various embodiments, the maximum height of pivotally deflectable plate 120 may be greater than the average lateral width of plate 120 by a factor of at least about 4, 8, 10, or 12. (Such ratios may also apply to base plate 110 and abutment plate 170.) In various embodiments, the maximum lateral thickness and/or the average lateral thickness of plate 120 and/or neck 150 may be less than ½ inch, ⅜ inch, 5/16 inch, ¼ inch, 3/16 inch, or ⅛ inch. In various embodiments, the maximum vertical height and/or the average vertical height of plate 120 may be at least about 3, 4, 5, 6, 7 or 8 inches. In various embodiments, the maximum vertical height and/or the average vertical height of neck 150 may be at least about ½ inch, % inch, 1 inch, 1¼ inch, or 1½ inch, and may be at most about 3, 2, 1½, 1¼, or 1 inch. It is emphasized that the designation that an item (e.g. a plate 120 or a neck 150) is vertically oriented does not require that the item must be oriented exactly vertically. However, in many embodiments at least some portion (often, the entirety) of the item will be oriented at least generally vertically (e.g. within plus or minus 20 degrees of vertical) in ordinary use of top bracket 1 (e.g. as installed on a ladder).

Arranging neck 150 in a vertical orientation as disclosed herein has the effect that a downward force on pivotally deflectable plate 120 (resulting e.g. from a force on a safety cable that is attached to plate 120) will result in a force being exerted on neck 150 along a direction that is at least generally normal to the thinnest dimension (the lateral dimension) of neck 150. It is noted that items such as e.g. steel plates have been sometimes used in applications in which the item deflects in response to a force. However, such items (e.g. steel plates as used as leaf springs in vehicle suspension systems) have been characteristically arranged so that the force is applied along a direction at least generally parallel to the thinnest dimension of the plate (e.g., a direction in which the plate would be expected to offer the least resistance to bending). In contrast, in the present disclosure, neck 150 is configured so that a force is applied thereto along a direction that is at least generally normal to the thinnest dimension of neck 150.

The dimensions (e.g. vertical height, forward-rearward extent, and lateral thickness) and/or the geometric shape of neck 150 may be chosen in consideration of the forces expected to be encountered in use of top bracket 1. In some embodiments, at least a portion of a lower edge 151 of neck 150 may be provided by at least a portion of a rearward end 181 of the above-discussed elongate gap 180. In specific embodiments, rearward end 181 of elongate gap 180 may comprise a smoothly arcuate shape (e.g. it may be radiused), which may advantageously minimize any local stresses on lower edge 151 of neck 150. In some embodiments, rearward end 181 of elongate gap 180 may take the form of an at least generally circular aperture 183, as shown in exemplary embodiment in FIG. 2. (Terms such as gap, aperture and slot, as used herein, denote an opening that passes entirely through the shortest dimension of an item.) In various embodiments, such an aperture may exhibit an average diameter that is greater than an average gap width of elongate gap 180, by a factor of at least about 1.6, 1.8, 2.2, or 2.6. In some convenient embodiments, a portion of an upper edge 182 of such an aperture 183 may provide at least a portion of a lower edge 151 of neck 150, as in the exemplary design of FIG. 2.

In some embodiments, at least a portion of upper edge 152 of neck 150 may be smoothly arcuate in shape (e.g. radiused). Thus, for example, upper edge 152 of neck 150 may join upper portion 113 of base plate 110 in a smooth arc rather than e.g. meeting at a sharp corner. Such arrangements may advantageously minimize any local stresses on upper edge 152 of neck 150. In some embodiments, upper edge 152 of neck 150 may be located at least generally or substantially even (in terms of vertical location) with upper edge 121 of plate 120. In other embodiments, a smoothly arcuate (e.g. generally circular) aperture 127 may be provided in such manner as to provide neck 150 with an upper edge 152 at least a portion of which is located vertically lower than upper edge 121 of plate 120, as in the exemplary embodiment of FIG. 2. In such instances, a lowermost point 128 of such an aperture 127 will be located vertically below an uppermost point 122 of plate 120. Such arrangements, e.g. in combination with a radiused or apertured rear end 181 of elongate gap 180 as discussed above, can allow the bending characteristics of neck 150 to be further tailored. In some embodiments, the centerpoint of such an upper aperture 127 may be located forward of a centerpoint of the above-mentioned lower aperture 183, as in the exemplary embodiment of FIG. 2. In some embodiments, the diameter of such an upper aperture 127 may be greater than the diameter of such a lower aperture 183, e.g. by a factor of at least about 1.2, 1.4, 1.6, 1.8 or 2.0.

In some embodiments, a top bracket 1 may comprise only one single unitary body that comprises a pivotally deflectable plate 120 and a neck 150. In further embodiments, this single unitary body may comprise an abutment plate 170 and a base plate 110. Such a base plate 110 may be attached to a rail 1030 e.g. by way of bolts 111 and 115. The single unitary body may comprise a single base plate that is e.g. attached to one side of a rail 1030; or, different rearward portions of the body may be split (bifurcated) e.g. into a Y-shape to provide two (e.g. upper and lower) base plates that sandwich the rail therebetween.

In other embodiments, a top bracket 1 may comprise two unitary bodies that each comprise a pivotally deflectable plate 120 and a neck 150; each unitary body may also comprise an abutment plate 170 and a base plate 110. Two such bodies may be arranged in any suitable format. For example, at least some portion (e.g. at least the respective pivotally deflectably plates) of the bodies may be abutted against each other so that their laterally-inward major surfaces are in contact with each other; if desired, the bodies may be bolted or welded together or otherwise attached to each other in such a configuration. In other embodiments, two such unitary bodies may be provided in a laterally-spaced-apart arrangement in which a space exists between the laterally-inward major surfaces of each unitary body. Such a laterally-spaced-apart arrangement of two bodies will be referred to herein as a "double-sided" configuration, in contrast with the single-body ("single-sided") configuration described previously with respect to FIG. 2. In some embodiments, two such bodies, each comprising at least a pivotally deflectable plate, a neck and a base plate, may be oriented at least generally parallel with each other, with the base plates being attached e.g. to opposite faces of a rail. In some embodiments of this type, two such independent bodies, each comprising at least a pivotally deflectable plate, a neck and a base plate, may collectively function as a top bracket.

However, in many convenient double-sided embodiments, two (or more) such laterally-spaced-apart bodies may be connected to each other, so that they may be mutually reinforcing particularly with respect to any lateral (side) loads that may be encountered. Thus in some embodiments, at least the respective pivotally deflectable plates of two such laterally-spaced apart bodies may be connected to each other e.g. by one or more bolts, beams, members, connectors, or the like. In various embodiments, the average spacing and/or the minimum spacing between two laterally-spaced-apart pivotally deflectable plates may be e.g. at least about ½ inch, ¾ inch, 1 inch, 1¼ inch, 1½ inch, 1% inch, or 2 inches. In further embodiments, the average spacing and/or the maximum spacing between two such plates may be at most about 3 inches, 2½ inches, 2 inches, or 1½ inches.

Figure 3:
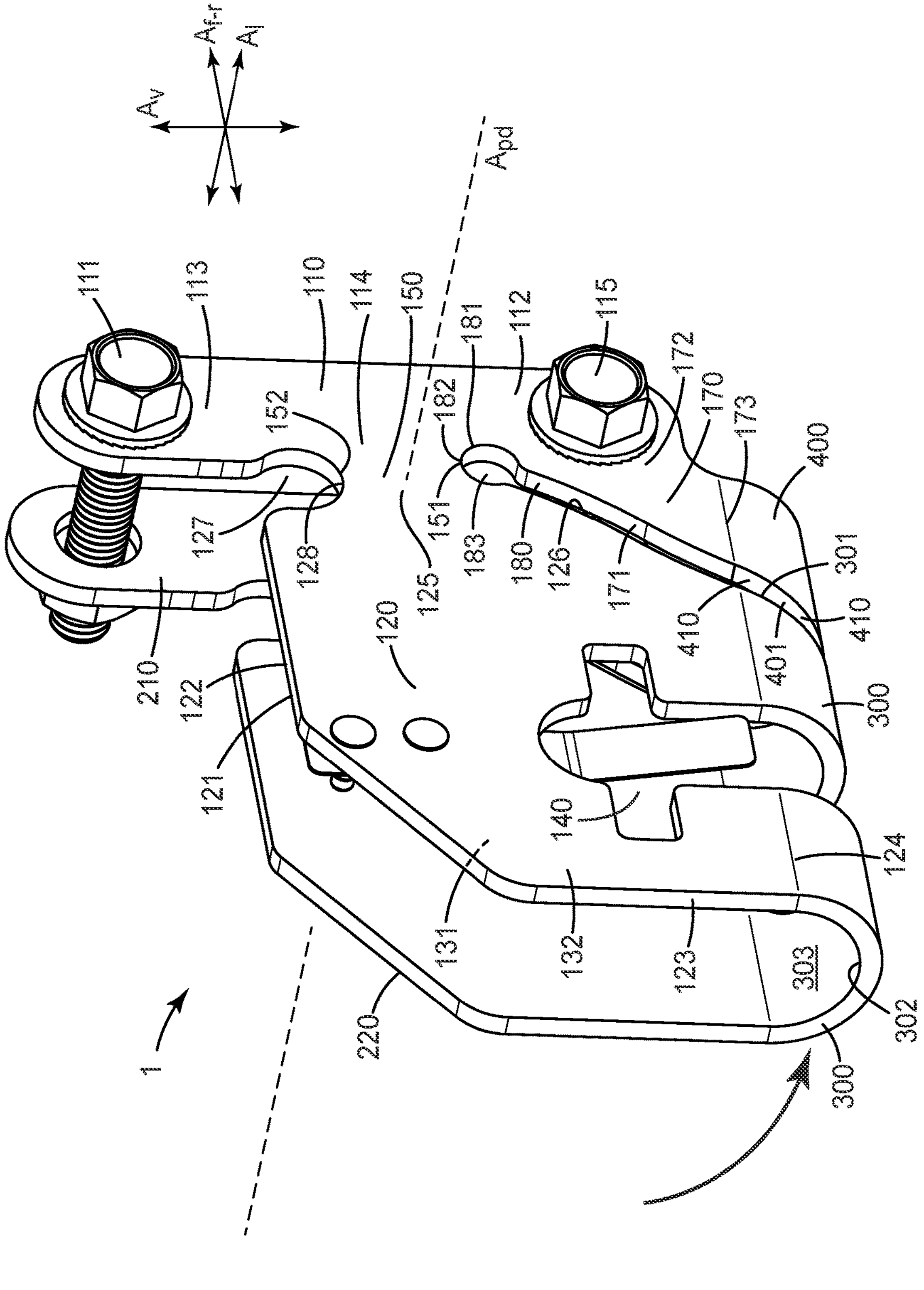
FIG. 3 is a side perspective view of another exemplary top bracket.
Figure 4:
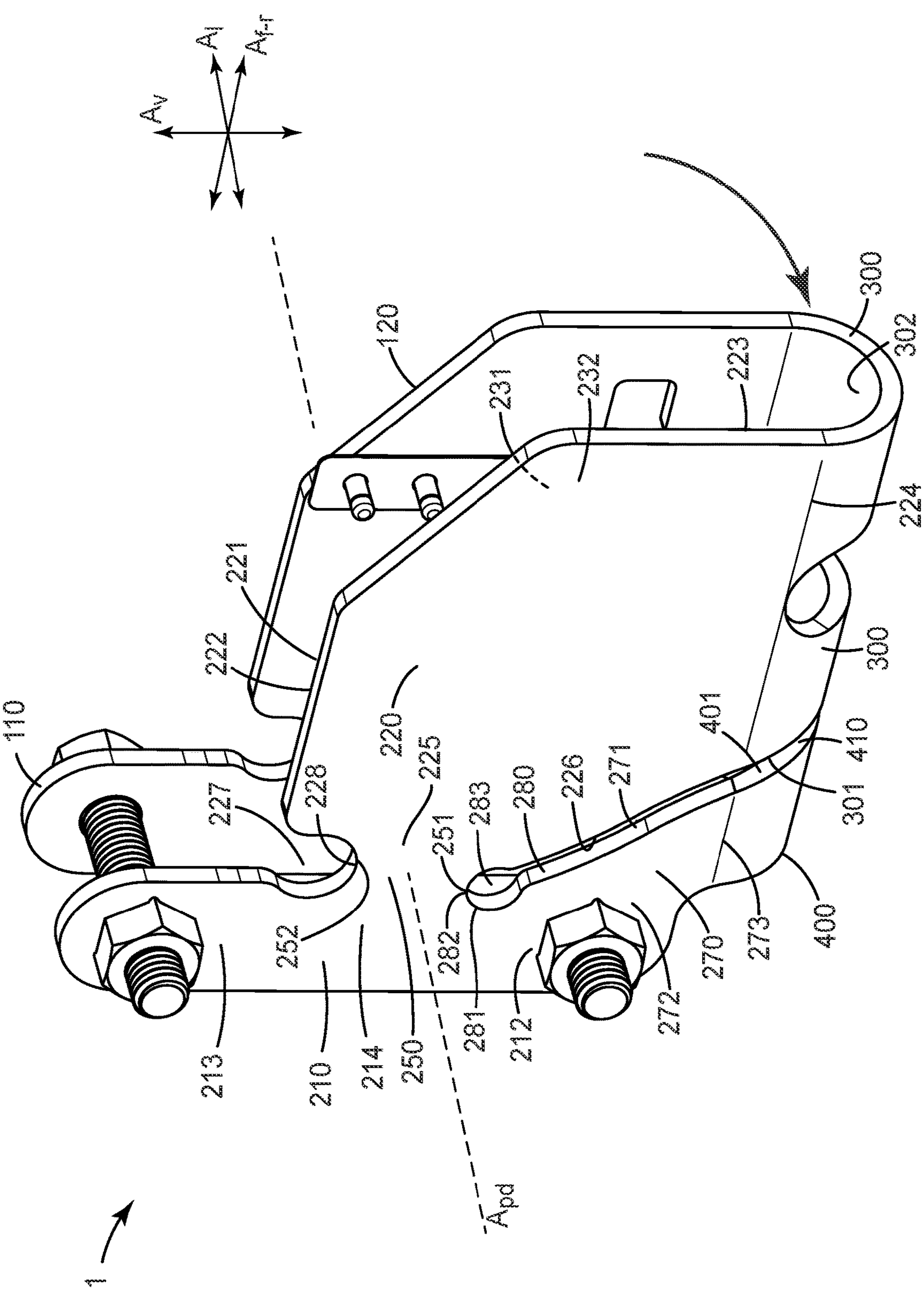
FIG. 4 is an opposite side perspective view of the exemplary top bracket of FIG. 3.

As shown in exemplary embodiment in FIGS. 3 and 4, in some embodiments first and second laterally-spaced apart bodies, respectively comprising first and second pivotally deflectable plates 120 and 220 and first and second necks 150 and 250, may be provided in such manner that plates 120 and 220 are connected to each other by a forward floor panel 300. As shown in FIGS. 3 and 4, forward floor panel 300 may connect a lowermost portion 124 of first plate 120 to a lowermost portion 224 of second plate 220. In some embodiments, forward floor panel 300 may be a separately made item (e.g. a beam or slab) that is attached to first and second plates 120 and 220. In such embodiments, such a forward floor panel may have any suitable shape, e.g. it may be relatively flat or it may be arcuate. In other embodiments forward floor panel 300 may be integral with both first plate 120 and second plate 220. In fact, these components, along with first and second necks 150 and 250 and first and second base plates 110 and 210, may all be portions of a single, unitary body, as in FIGS. 3 and 4.

In some convenient embodiments, such a single, unitary body can be made by starting with a material in the form of a flat plate (e.g. sheet steel), cutting the material into a desired shape, and then bending the material to form a generally U-shaped unitary structure with first and second portions that are laterally-spaced apart, e.g. a structure of the general type as shown in FIGS. 3 and 4. In some embodiments, such bending can be performed so that forward floor panel 300 is arcuate and concave-upward (when viewed along the forward-rearward axis of top bracket 1). As will become apparent later, configuring top bracket 1 so that forward floor panel 300 is arcuate and concave-up can advantageously facilitate the connecting of a safety cable to top bracket 1.

In a case in which a top bracket 1 comprises a forward floor panel 300 e.g. of the general type depicted in FIGS. 3 and 4, the previously mentioned maximum height of a pivotally deflectable plate will be measured from the uppermost point of the plate, to the lowermost point of the plate or to the junction of the plate with the forward floor panel, whichever is lower. For example, for first pivotally deflectable plate 120 as shown in FIG. 3, the maximum height of the plate will be the vertical distance from uppermost point 122 of upper edge 121, to lower boundary 124 of plate 120 (i.e., the point at which plate 120 meets floor panel 300). For the exemplary design as shown in FIG. 3, the minimum vertical height of neck 150 is approximately 25% of the maximum vertical height of plate 120. (It is noted in passing that slot 140 that is visible in FIG. 3 and that separates a portion of first pivotally deflectable plate 120 into forward and rearward sections and that separates floor panel 300 into forward and rearward sections, is used to facilitate connection of a safety cable to top bracket 1 and will be discussed later in detail.) In at least some embodiments, first neck 150 and second neck 250 will share a common axis of pivotal deflection $A_{pd}$ that passes through both first neck 150 and second neck 250, as shown in exemplary embodiment in FIGS. 3 and 4.

From the above discussions it is apparent that the arrangement shown in FIGS. 3 and 4 is an example of a double-sided arrangement in which the previously discussed items such as pivotally deflectable plate 120, neck 150, gap 180, and so on, are all "first" items, with at least generally similar or equivalent "second" items also being present, laterally-spaced apart from the first items. That is, for each "first" item such as first plate 120 and first neck 150, there may exist a corresponding "second" item (e.g. second plate 220 and second neck 250) that is laterally spaced apart from the first item. This being the case, all of the previous descriptions of various items with respect to the single-sided top bracket of FIG. 2, will be understood to apply to the like-numbered items of the first side of double-sided top bracket of FIGS. 3 and 4.

For purposes of brevity, not all of the counterpart second items of the first items that were previously discussed, are explicitly discussed herein. However, all such second items are assigned (e.g. in FIG. 4) reference numbers that are incremented by 100 from the first items, in order to emphasize that any such second items that are present may be at least similar to (e.g. equivalent to) their counterpart first items. Accordingly, all of the previous descriptions of these 100-numbered items will be understood to apply in like manner to their counterpart 200-numbered items, and are incorporated by reference at this point herein. This specifically applies to items 210, 212-214, 220-228, 250-252, 270-273 and 280-283. While some items, components or features of second deflectable plate 220 may be at least generally, substantially or essentially identical to their corresponding items, components or features of first deflectable plate 120, this is not necessarily required. For example, in the exemplary design of FIGS. 3 and 4, first deflectable plate 120 differs from second deflectable plate 220 in that plate 120 comprises a T-shaped slot 140 (discussed later in detail) that is not present in plate 220.

First and second deflectable plates 120 and 220 may respectively comprise laterally-inward major surfaces 131 and 231 and laterally-outward major surfaces 132 and 232. Deflectable plates 120 and 220 are vertically-oriented, as noted herein. As noted, this does not require that they be exactly vertical, nor does it require that they be exactly parallel to each other. Thus, for example, in some embodiments a top bracket 1 may comprise pivotally deflectable plates that are arranged in a generally V-shaped configuration rather than a generally U-shaped configuration. However, in some embodiments the first and second pivotally deflectable plates may indeed be at least generally, substantially, or essentially parallel to each other.

As is evident from FIGS. 3 and 4, the exemplary top bracket 1 depicted therein comprises a rearward floor panel 400 that integrally connects at least a part of lowermost portion 173 of first abutment plate 170 with at least a part of a lowermost portion 273 of second abutment plate 270. Again as evident from FIGS. 3 and 4, in some embodiments an elongate floor gap 410 may be present between a rearward edge 301 of forward floor panel 300 and a forward edge 401 of rearward floor panel 400. This elongate floor gap 410 can combine with the aforementioned first elongate gap 180 and a second elongate gap 280 (as seen in FIG. 4) to provide a continuous elongate gap. Such a gap may have the generally form of a rearwardly-tilted U when viewed along the forward-rearward axis of top bracket 1, as will be evident from FIGS. 3 and 4. In some embodiments, any change in the width of floor gap 410 may provide a visual indication of any permanent change in the position of first and second pivotally deflectable plates 120 and 220, in similar manner as described previously for first elongate gap 180 (and for second elongate gap 280).

Forward edge 401 of rearward floor panel 400 can act as an abutment surface that may be contacted by complementary abutment surface (rearward edge) 301 of forward floor panel in the event of a significant deflection of plates 120 and 220. Abutment surfaces 401 and 301 may act in concert with (or instead of) first abutment surfaces 126 and 171 as described previously, and corresponding second abutment surfaces 226 and 271, in the event of a relatively high force being applied to the first and second pivotally deflectable plates 120 and 220. In other words, rearward floor panel 400 may support pivotally deflectable plates 120 and 220 in the event that these plates deflect far enough for rear surface 301 of forward floor panel 300 to contact forward surface 401 of rearward floor panel 400.

In some embodiments, at least forward floor panel 300 may exhibit an arcuate, concave-upward shape, e.g. so that an upward major surface (floor) 302 of forward floor panel 300 defines a forward valley 303 (e.g. as seen in FIG. 3). Such a valley may be elongated along the forward-rearward axis of the top bracket with valley floor 302 exhibiting an at least generally concave-upward shape when viewed along the forward-rearward axis of top bracket 1. Such a valley may e.g. be ideally suited for receiving a fitting of a safety cable, as discussed below. Rearward floor panel 400 may similarly exhibit an arcuate, concave-upward shape so as to define a rearward valley (which may often be aligned with forward valley 303). However, such a rearward valley may not necessarily receive any portion of a fitting of a safety cable. In some embodiments, when top bracket 1 is viewed along its forward-rearward axis, first pivotally deflectable plate 120 may be at least generally laterally aligned with first abutment plate 170; second pivotally deflectable plate 220 may be at least generally laterally aligned with second abutment plate 270; and, at least lowermost portions of forward floor panel 300 may be at least generally vertically aligned with lowermost portions of rearward floor panel 400. (All such conditions are met in the exemplary arrangement of FIGS. 3-4, as will be evident from inspection of the front view of top bracket 1 in FIG. 7.) As will be evident from FIGS. 3 and 4, a top bracket 1 of the type disclosed in those Figures may be conveniently attached to a rail (not shown in either Figure) by way of bolts 111 and 115 that pass through apertures in first and second base plates 110 and 210. Any suitable attachment method may be used, however.

In various embodiments, a top bracket may be configured to respond differently to forces of different magnitude, as mentioned previously herein. For example, a top bracket may be configured so that a force applied to a pivotally deflectable plate or plates (e.g. by way of a safety cable connected thereto) e.g. in the range of approximately 1800 pounds or less, will not exceed the elastic limit of the neck or necks. A higher force, e.g. in the range of approximately 2000 pounds or greater, may result in plastic deformation so as to cause a permanent, observable change in the configuration (e.g. the width) of the above-described elongate gap. A still higher force, e.g. in the range of approximately 3000 pounds or greater, may result in plastic deformation such that a rearward abutment surface of a pivotally deflectable plate comes into contact with a forward abutment surface of an abutment plate, and/or a rearward abutment surface of a forward floor panel comes into contact with a forward abutment surface of a rearward floor panel. (It will be understood that even if such contact occurs, the pivotally deflectable plate may rebound at least slightly upon cessation of the force; however, a permanent, observable change in the condition of the gap will remain.) The parameters of the top bracket (including those parameters already discussed, as well as e.g. the distance that the safety cable is positioned forward from the axis of pivotal deflection) may be varied as desired in order to set these forces in desired ranges.

To facilitate of a vertical climbing fall protection system that includes top bracket 1, a safety cable 1001 will be connected to top bracket 1, as shown in exemplary representation in FIG. 1. Specifically, an upper end 1002 of safety cable 1001 will be connected to pivotally deflectable plate 120 (in the case of a single-sided design) or to either or both of first and second pivotally deflectable plates 120 and 220 (in the case of a double-sided design). This connection can be performed in any suitable manner, depending e.g. on the particular design of the pivotally deflectable plate(s). The connection may be permanent, or may be disconnectable, as desired. In one example, a deflectable plate may comprise an orifice through which a terminal end of the safety cable is passed. This end of the cable may then be turned back on itself and fastened to itself (e.g. by swaging, crimping, or the like) to make the connection. Or, a deflectable plate may be fitted with a clevis fastener, one or more gated hooks, single point anchors, or the like, to facilitate attachment of an upper end of a cable thereto. In general, the cable may be connected to a pivotally deflectable plate or plates at any suitable location. However, it will be appreciated that the distance that the cable connection is positioned forward of the axis of pivotal deflection will affect the moment (torque) that is applied to the pivotally deflectable plate(s) and the neck(s) upon the application of a given force to the cable. Thus, this distance may be taken into account along with the other previously-discussed parameters that may be used to set the response of the top bracket to forces of varying magnitude.

Figure 5:
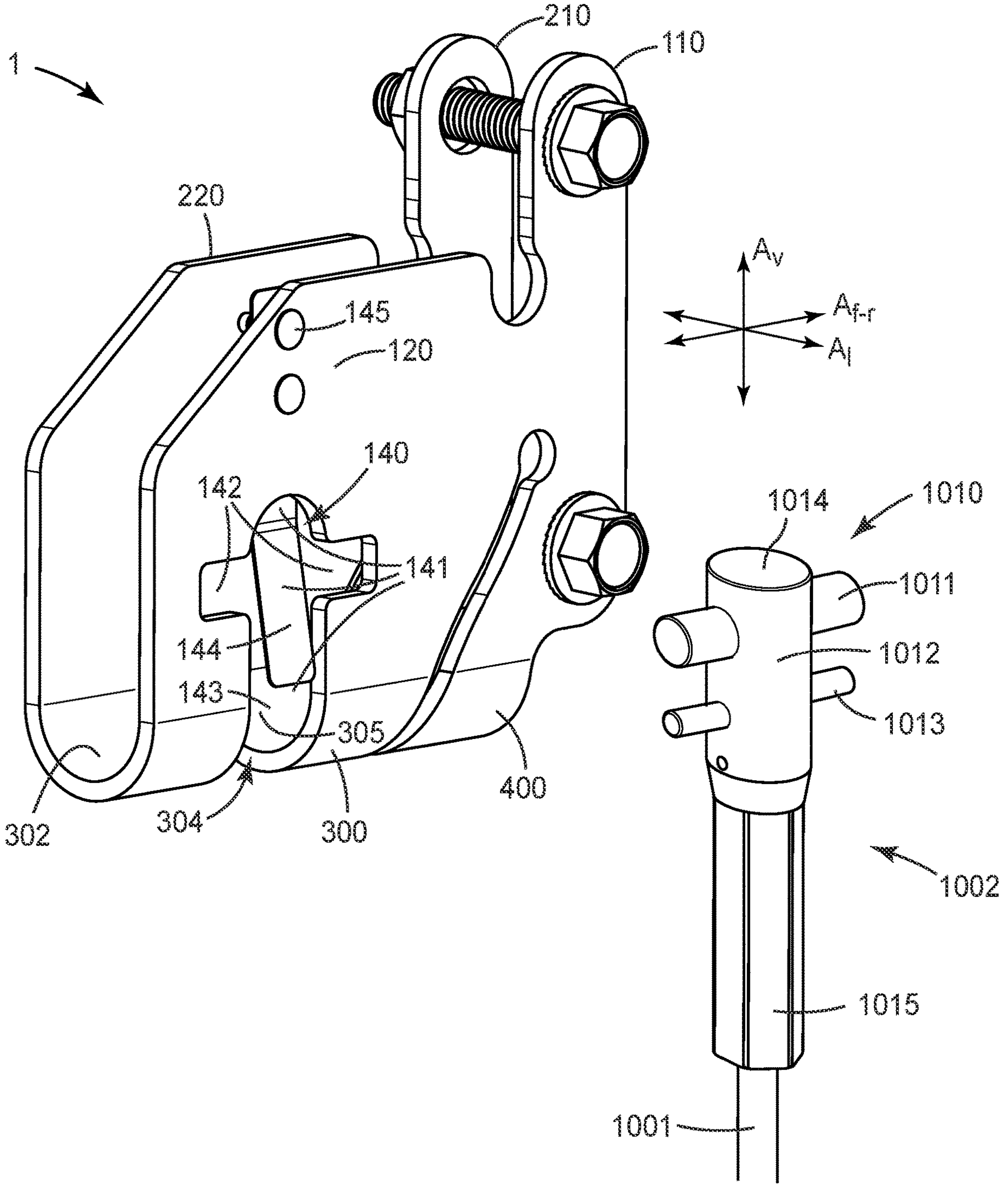
FIG. 5 is a side perspective view of the exemplary top bracket of FIG. 3, along with an upper end of an exemplary safety cable that is connectable to the top bracket.
Figure 6:
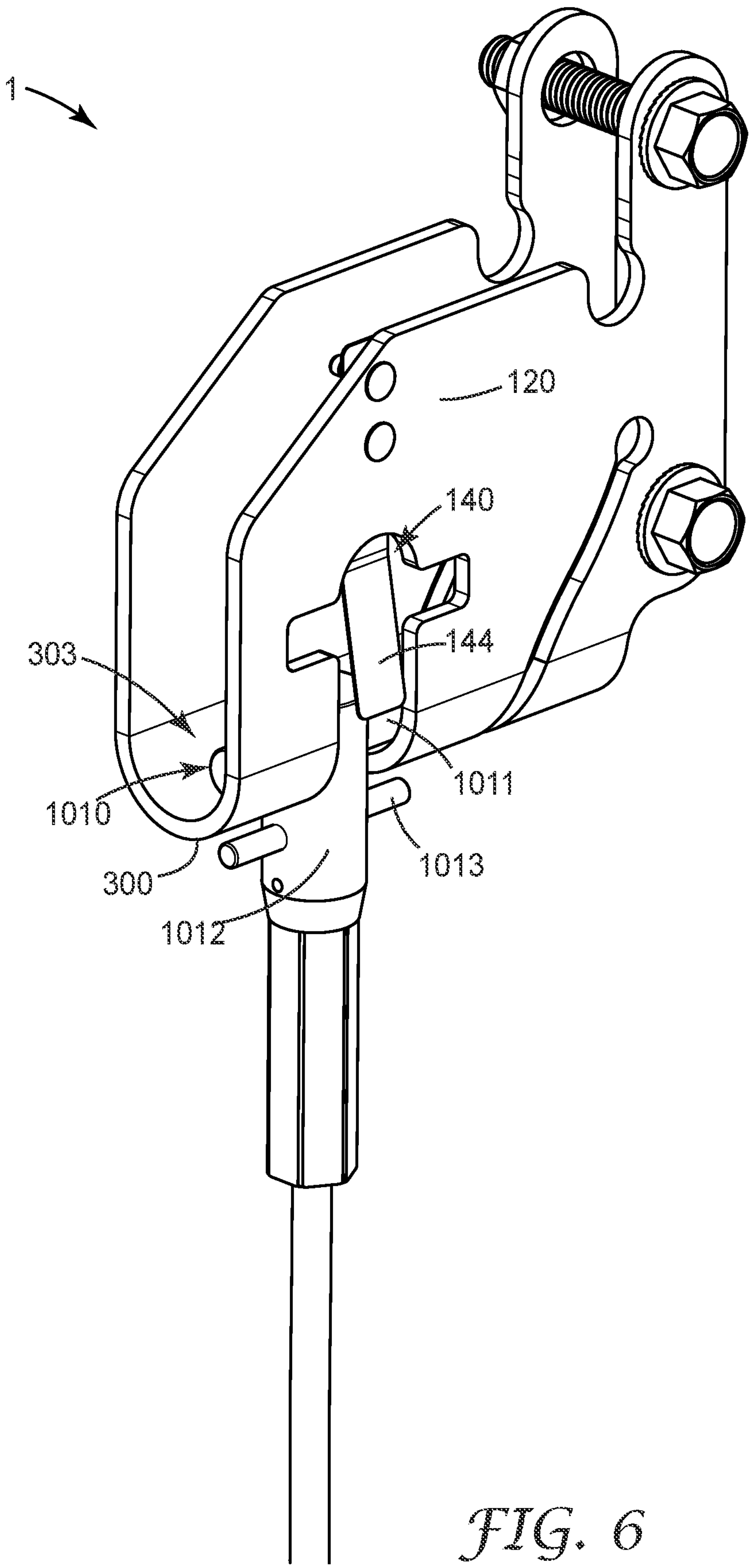
FIG. 6 is a side perspective view of the exemplary top bracket and safety cable of FIG. 5, with the upper end of the safety cable connected to the top bracket.
Figure 7:
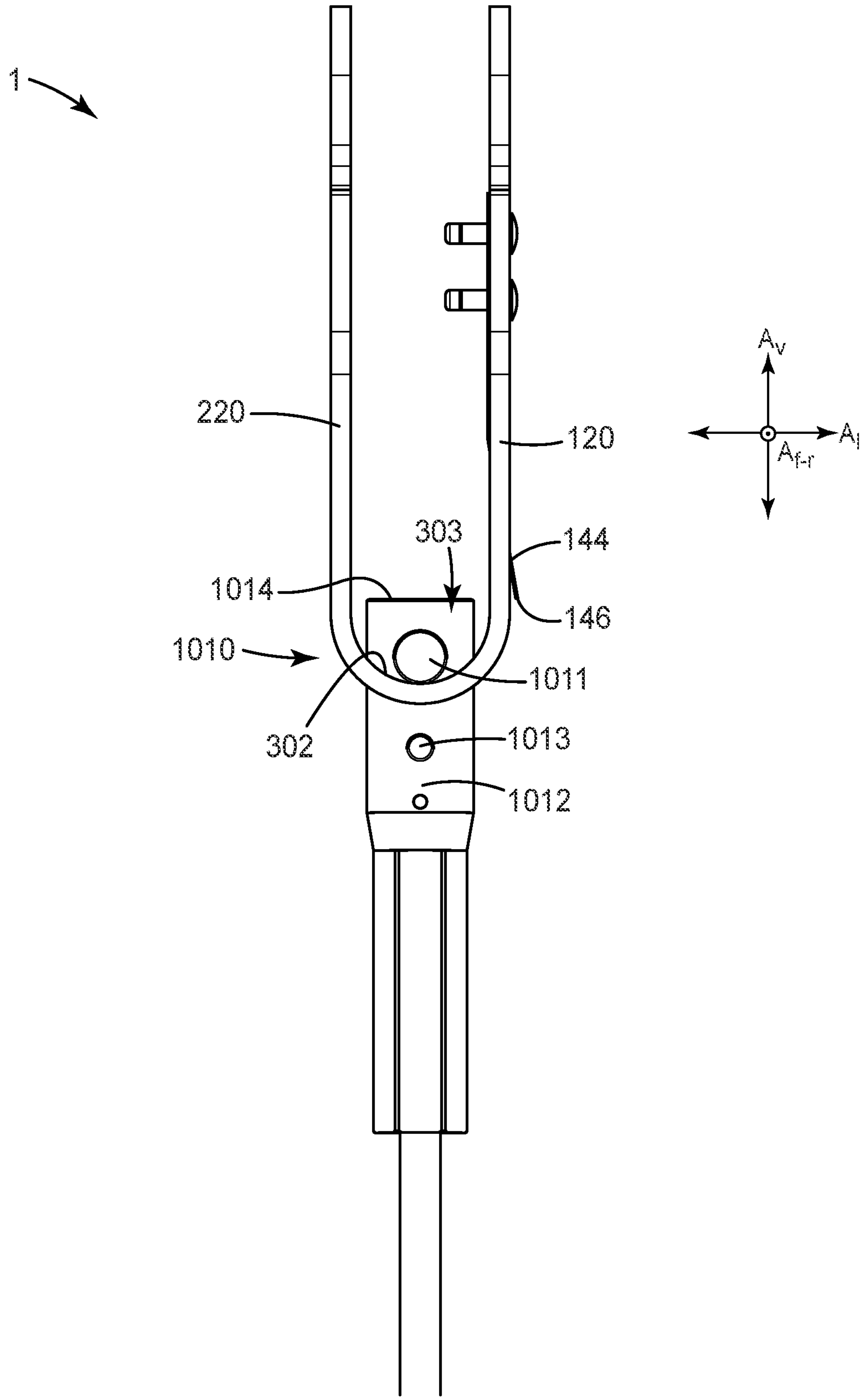
FIG. 7 is a front view of the exemplary top bracket and safety cable of FIG. 6.

It may be desirable that an upper end 1002 of a safety cable 1001 be connectable to top bracket 1 without the use of complex procedures that involve multiple steps and/or the use of tools. In particular, it is advantageous that an upper end 1002 of a safety cable comprise a factory-installed fitting that is connectable to the deflectable plate(s) of a top bracket by a simple operation, e.g. a single-step operation that can be performed one-handed if necessary. In some embodiments this can be achieved by providing at least one deflectable plate (e.g. a "first" plate 120) of the top bracket with an at least generally T-shaped slot 140 e.g. as shown in FIG. 5. Such a slot may comprise e.g. a vertical trunk 141 and a crossbar 142, configured to allow an at least generally T-shaped fitting 1010 of an upper end 1002 of safety cable 1001 to pass therethrough. As indicated in FIGS. 5, 6 and 7, the T-shaped fitting 1010 of cable 1001 can be passed through slot 140 so that a major crossbar 1011 of the T-shaped fitting can be seated on a floor 302 of a concave-upward valley 303 defined by the forward floor panel 300 of the top bracket. In addition to the T-shaped slot 140 of pivotally deflectable plate 120, a complementary slot 304 may be present in forward floor panel 300. A first end 305 of complementary slot 304 originates from the lower end 143 of vertical trunk 141 of T-shaped slot 140, as seen in FIG. 5; a second end 306 of complementary slot 304 may terminate at a location proximate lowermost portion 224 of second pivotally deflectable plate 220, as seen in FIG. 4. Complementary slot 304 of forward floor panel 300 is configured to allow a portion of the vertical trunk 1012 of the T-shaped fitting of the safety cable to extend downwardly therethrough when the T-shaped fitting is seated on the floor of the concave-upward valley defined by the forward floor panel, as shown in FIG. 6.

The providing of a forward floor panel of the general type described herein, that connects the first and second pivotally deflectable plates to each other and that is configured to receive a fitting of an upper end of a safety cable, will be understood to constitute configuring the pivotally deflectable plates to collectively allow the upper end of a safety cable to be connected thereto. It will be further understood that the concept of an at least generally T-shaped fitting of a safety cable broadly encompasses any fitting that comprises at least a vertical trunk and a component that extends outward more widely than the width of the vertical trunk. That is, any such fitting is not necessarily required to exhibit a shape that is an exact "T", but rather might be take the form of e.g. a vertical trunk topped by a bulbous head. The at least generally T-shaped slot of the pivotally deflectable plate can be shaped commensurately.

In the exemplary embodiment of FIGS. 5-6, T-shaped fitting 1010 of safety cable 1001 further comprises a minor crossbar 1013. The presence of this minor crossbar requires that the T-shaped fitting should be rotated (counterclockwise, in the view of FIG. 5) e.g. to an angle approximately 45 degrees away from the vertical, so that the minor crossbar does not interfere with the ability to insert the upper portion of the T-shaped fitting (including the major crossbar 1011) through the T-shaped slot of the top bracket. When the T-shaped fitting is seated in place in the top bracket (e.g. as in FIG. 6), the minor crossbar can provide that the T-shaped fitting of the cable cannot be inadvertently dislodged sufficiently far upward to allow the T-shaped fitting to exit through the T-shaped slot of the top bracket. In other words, upward movement of the safety cable will cause the minor crossbar of the T-shaped fitting to contact the underside of forward floor panel 300 to prevent any further upward movement of the T-shaped fitting. Thus, the cable fitting can only be removed from the top bracket by rotating the fitting (counterclockwise, in the view of FIG. 6) so that the minor crossbar does not prevent sufficient upward movement of the fitting to pass the major crossbar through the T-shaped flow.

Figure 8:
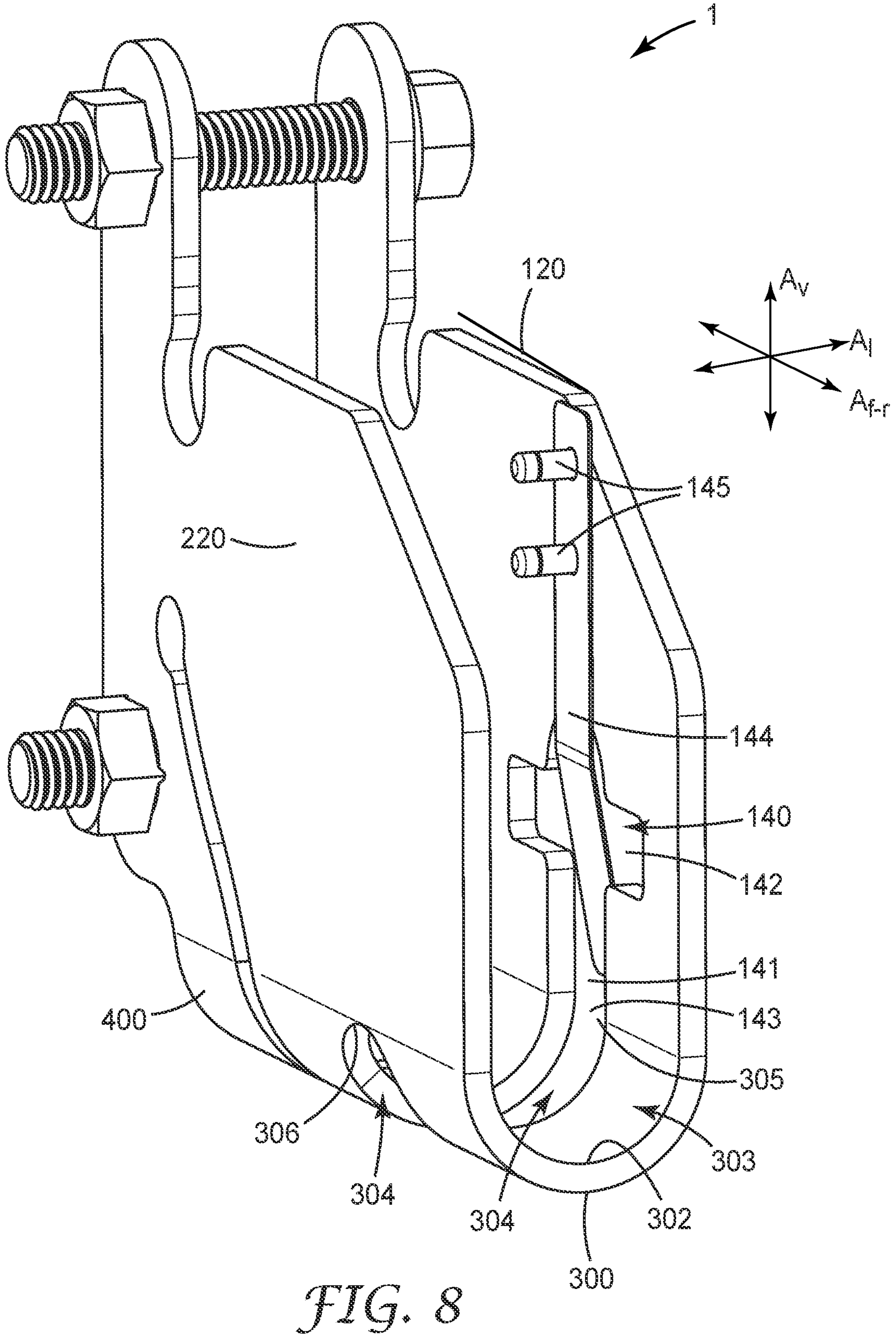
FIG. 8 is a side perspective view of the exemplary top bracket of FIG. 4, viewed from a slightly different angle from that of FIG. 4.

In the exemplary embodiment depicted herein, top bracket 1 comprises an additional feature, namely, a retaining tab 144, best seen in FIG. 8. Tab 144 is attached to first pivotally deflectable plate 120 (e.g. by fasteners 145) and is a laterally-inwardly deflectable tab that is configured to laterally obstruct at least a portion of T-shaped slot 140. This provides that the T-shaped fitting 1010 of safety cable 1001 cannot pass laterally through T-shaped slot 140 unless retaining tab 144 is deflected laterally inwardly away from the T-shaped slot a sufficient amount. In some specific embodiments, retaining tab 144 may be attached to an upper portion of first pivotally deflectable plate 120 and may be an elongate tab that extends at least generally downward to laterally obstruct at least a portion of the vertical trunk 141 of T-shaped slot 140.

The fact that retaining tab 144 is laterally inwardly deflectable means that tab 144 can be deflected inward during the act of laterally inserting the T-shaped fitting 1010 of safety cable 1001 through T-shaped slot 140 of top bracket 1. Although this may be done by applying laterally inward finger pressure to retaining tab 144, tab 144 may be conveniently deflected inward by pressing some portion of fitting 1010 against tab 144 during the act of inserting fitting 1010 through slot 140. This provides that fitting 1010 can be e.g. held with one hand (e.g. by grasping shroud portion 1015 of fitting 1010), rotated slightly as noted above, and passed laterally inward through slot 140, with retaining tab 144 being inwardly deflected by the act of passing fitting 1010 through slot 140. In other words, the arrangements disclosed herein allow an upper end 1002 of a safety cable 1001 to be connected to a top bracket 1 in a one-handed, single-step operation. Fitting 1010 can then be allowed to descend to the floor 302 of valley 303 (as shown in FIGS. 6 and 7) so that it rests against floor (upward major surface) 302 of forward floor panel 300, thus completing the process of connecting fitting 1010 to pivotally deflectable plates 120 and 220 of top bracket 1. It will be appreciated that this arrangement allows easy visual confirmation that the fitting-bracket connection has been established.

Once fitting 1010 is seated within top bracket 1 as described above (and as shown in FIGS. 6 and 7), fitting 1010 is not removable from top bracket 1 in ordinary use of top bracket 1 other than by deliberate action. That is, with fitting 1010 in a position e.g. as shown in FIG. 7, in order to remove fitting 1010 from its seated position within valley 303 of the top bracket, several actions are necessary. Fitting 1010 must be rotated (counterclockwise, in the view of FIG. 7) e.g. to an angle of about 45 degrees away from the vertical in order that minor crossbar 1013 of fitting 1010 does not interfere with the ability to move fitting 1010 upwards. Also, retaining tab 144 must be moved laterally inwardly. The above-mentioned rotating of fitting 1010 will provide that fitting 1010 will not interfere with the process of moving retaining tab 144. That is, the rotating of fitting 1010 will provide that uppermost surface 1014 of fitting 1010 will not obstruct the lowermost end 146 of retaining tab 144 from moving laterally inwardly. With fitting 1010 rotated and with retaining tab 144 deflected laterally inwardly, fitting 1010 can then be moved upward a sufficient amount that major crossbar 1011 of fitting 1010 is vertically aligned with crossbar 142 of T-shaped slot 140. Fitting 1010 can then be moved laterally outward to pass through T-shaped slot 140, thus removing fitting 1010 from the lateral interior of top bracket 1 and thus disconnecting upper end 1002 of safety cable 1001 from top bracket 1. It will be appreciated that these arrangements can minimize any chance of fitting 1010 being removed from top bracket 1, except by deliberate action by a worker.

It will be appreciated that the arrangements disclosed herein by which an upper end of a safety cable can be disconnectably connected to a top bracket, are not necessarily limited to cases in which the top bracket is of the type disclosed earlier herein (e.g. comprising pivotally deflectable plates that extend by way of necks, from base plates). However, it will be understood that if top bracket 1 does comprise such pivotally deflectable plates, necks, etc., top bracket 1 can be configured so that the presence of a T-slot 140 in a deflectable plate 120 (and a complementary slot 304 in a forward floor panel 300) will not detract from the previously-described arrangement in which pivotally deflectable plates 120 and 220 and forward floor panel 300, will pivotally deflect at least generally bodily about an axis of pivotal deflection $A_{pd}$. That is, the assembly of the pivotally deflectable plates and the forward floor panel, may be configured to rotate generally as a whole rather than undergoing significant deformation, even with some material having been removed to provide the above-described slots. It will also be appreciated that the presence of a slot 304 in the forward floor panel, and/or the presence of an elongate gap 410 between forward floor panel 300 and rearward floor panel 400, can advantageously minimize any accumulation of e.g. rainwater within top bracket 1.

It will be understood that a top bracket comprising first and second laterally-spaced plates and a floor panel, at least one of the laterally-spaced plates comprising an at least generally T-shaped slot and the floor panel being shaped to receive a fitting of a safety cable that is passed through the slot, is not necessarily limited to use with first and second laterally-spaced plates that are pivotally deflectable. Rather, such arrangements can be used with any top bracket to which it is desired to enable one-handed connection of a safety cable thereto. In other words, an at least generally T-shaped slot and other features and components disclosed above, may be used with laterally-spaced plates that are at least substantially non-deflectable. (Likewise, the use of one or more pivotally-deflectable plates is not necessarily limited to use with a cable connection that involves e.g. a T-shaped fitting.)

Top bracket 1 may be made using any suitable manufacturing process that can produce one or more unitary bodies comprising at least a pivotally deflectable plate portion and a neck portion that connects the deflectable plate to a base plate. In various embodiments, top bracket 1 may be made by e.g. machining a block of metal, by forging, and so on. In particularly convenient embodiments, a top bracket 1 of the general type disclosed in FIGS. 3-8 (comprising first and second pivotally deflectable, laterally-spaced apart plates and so on, as a single unitary body) may be produced by starting with a flat layer of suitable material (e.g. sheet steel). The flat layer of material may be cut (e.g. by laser-cutting) to provide an shaped piece with an outer perimeter. The flat layer of material may also be cut e.g. to provide slots that will form the various elongate gaps described earlier herein, and/or to provide a T-shaped slot and a complementary slot also as described earlier herein. Orifices may also be cut that will allow passage of bolts to connect the top bracket to a rail. The flat layer of material may then be controllably deformed (bent), by suitable metal-forming methods, about an axis that will become the forward-rearward axis of the thus-formed top bracket. The bending may be carried out in a single step, or in a series of steps. The bending may be carried out such that at least the pivotally deflectable plates exhibit a desired lateral spacing therebetween, and/or so that the lowermost portions of the top bracket (the forward floor panel and the rearward floor panel) exhibit an arcuate shape with a desired radius of curvature (of e.g. at least about 0.5, 1.0, 1.5, or 2.0 inches). It will be clear from this discussion that the previously-presented components of top bracket 1 (e.g. pivotally deflectable plates, necks, base plates, a forward floor panel and a rearward floor panel) may indeed be portions of a single, unitary, integral body (made from one flat layer of material). To this unitary body may of course be added various separately-made components (e.g. a retaining tab, fasteners for such a tab, and so on), as desired.

A top bracket as disclosed herein may be used with any vertical climbing fall protection system. As noted earlier, in some embodiments such a system may comprise, in addition to top bracket 1 and safety cable 1001, a bottom bracket 1040 which may be e.g. attached to a bottom rail 1041, as seen in exemplary embodiment in FIG. 1. The system may include a tensioning device 1042 (which may be conveniently located e.g. proximate bottom bracket 1040) which allows an appropriate tension to be applied to cable 1001. It will be appreciated that the above-described pivotally deflectable plate, neck, and so on, may be configured to take into account any force exerted by such tensioning, in addition to taking into account the force from the weight of one or more workers, the forces experienced during a worker fall, and so on. The system may further include one or more cable guides 1050, which may be spaced at desired intervals along cable 1001. The system may further include a cable sleeve 1060 (shown in exemplary embodiment in FIG. 1, although any cable sleeve of any suitable design may be used). Such a sleeve will often comprise a connection 1061 that can be connected to a harness worn by a worker, with the connection comprising at least one shock absorber 1062 (of any suitable design, e.g. a tear web, tear strip, or the like). Cable sleeve 1060 is configured to travel along cable 1001 e.g. as the worker climbs upward, and can be configured to lock up (or to travel downward at a slow, controlled speed) in the event of a worker fall, thus arresting the fall of the worker. Shock absorber 1062 can act to reduce the forces encountered by the worker during the fall arrest.

As noted, in at least some embodiments top bracket 1 may be installed in a desired (e.g. elevated) location by way of being attached to a rail 1030. The term rail broadly encompasses any item (e.g. a beam, flange or the like) that is at least slightly elongated at least generally in a vertical direction when installed in a desired elevated location. In some embodiments, a rail 1030 is configured to be attached to a ladder 1020 e.g. as in the exemplary illustration of FIG. 1. In some such cases, rail 1030 may be attached to a ladder 1020 with top bracket 1 being attached to rail 1030 thereafter. In other embodiments, top bracket 1 may be pre-attached to rail 1030, so that rail 1030 is attached to a ladder 1020 with top bracket 1 already in place on rail 1030. In some embodiments, rail 1030 may be configured (e.g. with one or more attachment mechanisms that are able to be slidably moved along at least a portion of the elongate length of rail 1030, as in FIG. 1) to accommodate ladders of slightly different rung spacing. Rail 1030 may be configured to be attachable to any number of ladder rungs (e.g. one, two, three, four, or more); in some embodiments a rail 1030 may comprise multiple sections that are telescopically movable relative to each other. In various embodiments, rail 1030 may be attached to a ladder 1020 so that an upper end of rail 1030 (e.g. bearing top bracket 1) may be located generally below, even with, or above an upper end of ladder 1020. A rail 1030 may be attached to a rung or rungs 1021 (or to any suitable supporting structure, regardless of whether the structure is a component of a ladder or not) e.g. by way of any suitable bolts, or by welding or the like. In some embodiments a rail may comprise a so-called single point anchor (positioned e.g. at an upper end of rail 1030 as in the exemplary design of FIG. 1).

Figure 9:
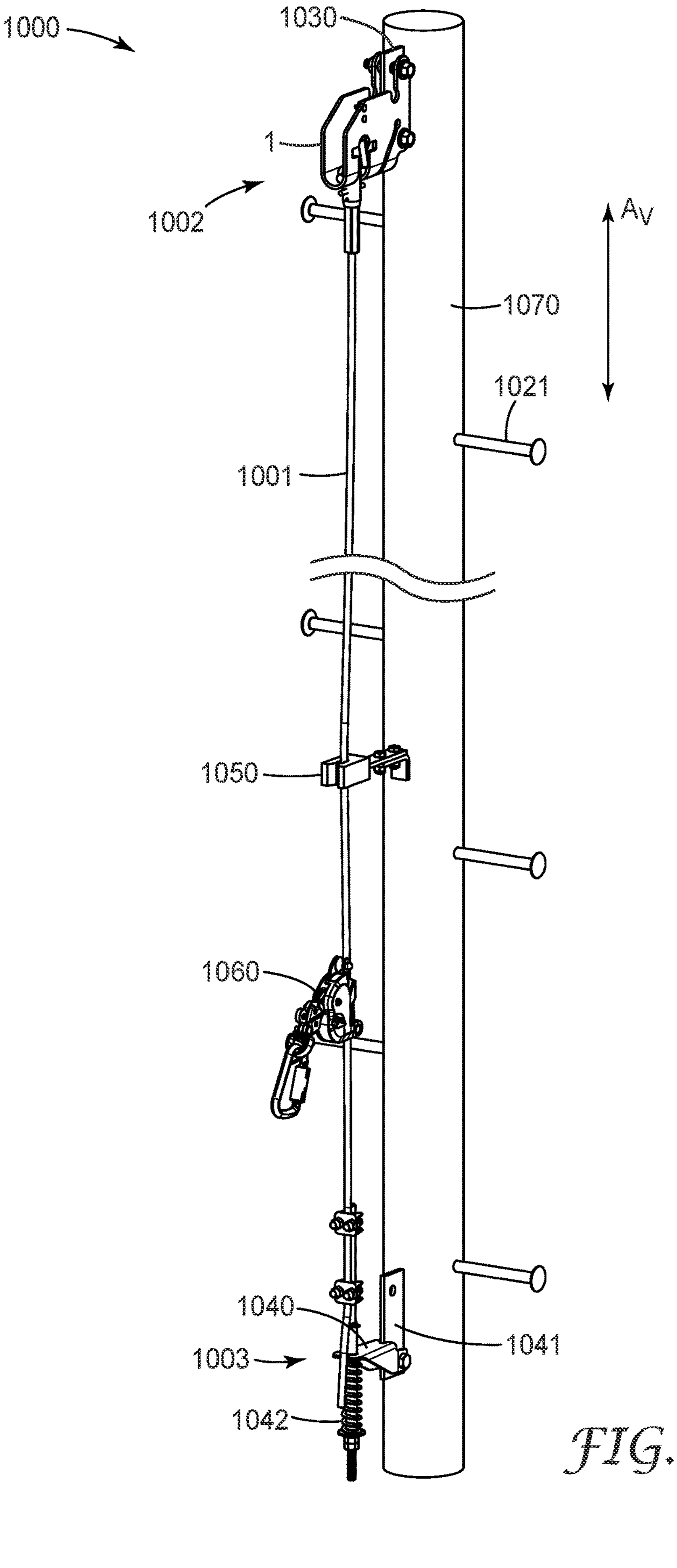
FIG. 9 is a front perspective view of an exemplary monopole tower fitted with an exemplary vertical climbing fall protection system.

The herein-disclosed arrangements can be used in any situation in which fall protection during vertical climbing (and/or descending) is desired. This is not limited to situations involving ladders of the general type shown in FIG. 1. For example, top bracket 1 may be used with a fall protection system 1000 that is installed on a so-called monopole 1070 as shown in exemplary embodiment in FIG. 9. Such a monopole may comprise a ladder collectively provided by outwardly-protruding rungs (posts) 1021 as in the exemplary embodiment of FIG. 9. In such a case, rail 1030 to which top bracket 1 is attached, may take the form of an outwardly protruding, vertically extending, flange or beam. Such a rail may be e.g. formed integrally with the main body of a monopole; or, it may be a separately-made item that is attached (directly or indirectly) to the main body of the monopole e.g. by welding, or by any suitable attachment mechanism. It is thus emphasized that the term "ladder" broadly encompasses any arrangement of rungs, steps, outcroppings, recesses, platforms, footholds, handholds, etc., that is configured to allow vertical or generally vertical climbing and/or descending by a human. (In this context a ladder is not necessarily required to be movable from place to place and in fact will often be fixed in place.) The "rungs" of any such ladder are not limited to the above-described types, but may include e.g. members or beams of a lattice (truss) tower, and so on. A ladder and/or the rungs thereof of such a safety system may be made of any suitable material, e.g. metal, wood, polymeric materials, and so on. A rail (e.g. for use with a ladder of any type) of such a system may be made of any suitable material, e.g. galvanized steel, stainless steel, or the like. A safety cable of such a system may be of any suitable type, made of any suitable material, e.g. galvanized steel or stainless steel. In various embodiments, such a cable may be e.g. ⅜ inch or 5/16 inch diameter, and/or it may be of a 1×7 or 7×19 strand construction.

A fall protection safety system comprising a top bracket of any type or design disclosed herein may find use in any application in which fall protection while climbing, descending, or maintaining a particular height is desired. Although discussions herein have mainly concerned exemplary uses that involve climbing above an access point (e.g. at ground level), the arrangements disclosed herein may also find use in applications that involve descending below an access point (e.g., into a cargo hold or tank of a ship, into a mine shaft or air shaft, into a grain bin, and so on). A vertical climbing fall protection safety system comprising a top bracket of any type or design disclosed herein may meet the requirements of any applicable standard. In various embodiments, such a safety system may meet the requirements of ANSI Z359.16-2016 (Safety Requirements for Climbing Ladder Fall Arrest Systems), as specified in 2016. In particular embodiments, such a safety system may meet the requirements of Section 4.2.1 (Dynamic Performance) and Section 4.2.2.4 (Static Strength) of this standard. In some embodiments, such a safety system may meet the requirements of OHSA rule 1926.1053, Section (a)(22)(i) (Dynamic Strength).

LIST OF EXEMPLARY EMBODIMENTS

Embodiment 1 is a top bracket for supporting a safety cable of a vertical climbing fall protection system, the top bracket exhibiting a vertical axis, a forward-rearward axis, and a lateral axis, and the top bracket comprising a unitary, integral body comprising: first and second laterally-spaced, vertically-oriented base plates; first and second laterally-spaced, vertically-oriented, pivotally deflectable plates that are configured to collectively allow an upper end of a safety cable to be connected thereto; wherein the first pivotally deflectable plate is integrally and pivotally connected to the first base plate by a first vertically-oriented neck that is configured so that the first pivotally deflectable plate extends at least generally forwardly from the first base plate and wherein the second pivotally deflectable plate is integrally and pivotally connected to the second base plate by a second vertically-oriented neck configured so that the second pivotally deflectable plate extends at least generally forwardly from the second base plate, and wherein the top bracket is configured so that the first and second pivotally deflectable plates share a common axis of pivotal deflection that passes through the first neck and the second neck and that is oriented at least generally parallel to the lateral axis of the top bracket; and wherein the top bracket further comprises: a first vertically-oriented abutment plate that extends forwardly from a lower section of the first base plate and that comprises a forward abutment surface that is separated from a rearward abutment surface of the first pivotally deflectable plate by a first elongate gap; and a second vertically-oriented abutment plate that extends forwardly from a lower section of the second base plate and comprises a forward abutment surface that is separated from a rearward abutment surface of the second pivotally deflectable plate by a second elongate gap.

Embodiment 2 is the top bracket of embodiment 1 wherein the first and second elongate gaps each exhibit a long axis that, over at least about 70% of an elongate length of the elongate gap, is oriented within about 10 to about 50 degrees of the vertical axis of the top bracket.

Embodiment 3 is the top bracket of any of embodiments 1-2 wherein a portion of a lower edge of the first neck defines at least a portion of an upper edge of a rear end of the first elongate gap and wherein a portion of a lower edge of the second neck defines at least a portion of an upper edge of a rear end of the second elongate gap.

Embodiment 4 is the top bracket of any of embodiments 1-3 wherein the first elongate gap exhibits a gap width that is at least substantially uniform over at least about 80% of an elongate length of the first elongate gap, and wherein the second elongate gap exhibits a gap width that is at least substantially uniform over at least about 80% of an elongate length of the second elongate gap.

Embodiment 5 is the top bracket of embodiment 4 wherein the first elongate gap comprises a rear end that takes the form of a first at least generally circular lower aperture, which first lower aperture exhibits a diameter that is greater than an average gap width of the first elongate gap by a factor of at least about 1.8; and, wherein the second elongate gap comprises a rear end that takes the form of a second at least generally circular lower aperture, which second lower aperture exhibits a diameter that is greater than an average gap width of the first elongate gap by a factor of at least about 1.5.

Embodiment 6 is the top bracket of any of embodiments 1-5 wherein an upper edge of the first neck comprises a lowermost point that is located lower than an uppermost point of the first pivotally deflectable plate, and wherein an upper edge of the second neck comprises a lowermost point that is located lower than an uppermost point of the second pivotally deflectable plate.

Embodiment 7 is the top bracket of embodiment 6 wherein at least a portion of the upper edge of the first neck comprises an arcuate shape that provides a portion of a first at least generally circular upper aperture and wherein at least a portion of the upper edge of the second neck comprises an arcuate shape that provides a portion of a second at least generally circular upper aperture.

Embodiment 8 is the top bracket of any of embodiments 1-7 wherein a minimum vertical height of the first neck is no greater than about 30% of a maximum vertical height of the first pivotally deflectable plate, and wherein a minimum vertical height of the second neck is no greater than about 30% of a maximum vertical height of the second pivotally deflectable plate.

Embodiment 9 is the top bracket of any of embodiments 1-8 where the top bracket further includes: a forward floor panel that integrally connects at least a part of a lowermost portion of the first pivotally deflectable plate with at least a part of a lowermost portion of the second pivotally deflectable plate; and, a rearward floor panel that integrally connects at least a part of a lowermost portion of the first abutment plate with at least a part of a lowermost portion of the second abutment plate.

Embodiment 10 is the top bracket of embodiment 9 wherein an elongate floor gap is present between a rearward edge of the forward floor panel and a forward edge of the rearward floor panel, and wherein the elongate floor gap, the first elongate gap and the second elongate gap collectively provide a continuous, elongate gap that is at least generally U-shaped when viewed along the forward-rearward axis of the top bracket.

Embodiment 11 is the top bracket of any of embodiments 9-10 wherein at least the forward floor panel exhibits an arcuate, concave-upward shape so that an upward major surface of the forward floor panel defines a forward valley that is elongated along the forward-rearward axis of the top bracket and that exhibits an at least generally concave-upward shape when viewed along the forward-rearward axis of the top bracket.

Embodiment 12 is the top bracket of any of embodiments 9-11 wherein the rearward floor panel exhibits an arcuate, concave-upward shape so that an upward major surface of the rearward floor panel defines a rearward valley that is elongated along the forward-rearward axis of the top bracket and that exhibits an at least generally concave-upward shape when viewed along the forward-rearward axis of the top bracket.

Embodiment 13 is the top bracket of any of embodiments 9-12 wherein, when the top bracket is viewed along the forward-rearward axis of the top bracket, the first pivotally deflectable plate is at least generally laterally aligned with the first abutment plate, the second pivotally deflectable plate is at least generally laterally aligned with the second abutment plate, and the forward floor panel is at least generally vertically aligned with the rearward floor panel.

Embodiment 14 is the top bracket of any of embodiments 1-13 wherein the first pivotally deflectable plate, the second pivotally deflectable plate, and a forward floor panel that integrally connects at least a part of a lowermost portion of the first pivotally deflectable plate with at least a part of a lowermost portion of the second pivotally deflectable plate, are all portions of the single, unitary, integral body, which body is at least generally U-shaped when viewed along the forward-rearward axis of the top bracket.

Embodiment 15 is the top bracket of embodiment 14 wherein the first neck, the second neck, the first base plate, the second base plate, the first abutment plate, the second abutment plate, and a rearward floor panel that integrally connects at least a part of a lowermost portion of the first abutment plate with at least a part of a lowermost portion of the second abutment plate, are all portions of the single, unitary, integral body.

Embodiment 16 is the top bracket of any of embodiments 9-15 wherein the first pivotally deflectable plate comprises a slot that is at least generally T-shaped when viewed along the lateral axis of the top bracket; and, wherein the forward floor panel comprises a complementary slot that originates from a lowermost end of a vertical trunk of the T-shaped slot of the first pivotally deflectable plate, and wherein the complementary slot of the forward floor panel extends across a lateral extent of the forward floor panel and terminates proximate a lowermost edge of the second pivotally deflectable plate.

Embodiment 17 is the top bracket of embodiment 16 wherein the T-shaped slot of the first pivotally deflectable plate is configured to allow a major crossbar and a portion of a vertical trunk of an at least generally T-shaped fitting of an upper end of a safety cable to pass laterally through the T-shaped slot so that a major crossbar of the T-shaped fitting of the safety cable can be seated on a floor of a concave-upward valley defined by the forward floor panel; and, wherein the complementary slot of the forward floor panel is configured to allow a portion of the vertical trunk of the T-shaped fitting of the safety cable to extend therethrough when the T-shaped fitting is seated on the floor of the concave-upward valley defined by the forward floor panel.

Embodiment 18 is the top bracket of any of embodiments 16-17 wherein the top bracket further comprises a laterally-inwardly deflectable tab that is attached to the first pivotally deflectable plate and that is configured to laterally obstruct at least a portion of the vertical trunk of the T-shaped slot so that the at least generally T-shaped fitting of the safety cable cannot pass laterally through the T-shaped slot unless the deflectable tab is deflected laterally inwardly away from the T-shaped slot.

Embodiment 19 is the top bracket of embodiment 18 wherein the laterally-inwardly deflectable tab is attached to an upper portion of the first pivotally deflectable plate and is an elongate tab that extends at least generally downward to laterally obstruct at least a portion of the vertical shank of the T-shaped slot unless deflected laterally inwardly away from the T-shaped slot.

Embodiment 20 is the top bracket of any of embodiments 1-19 wherein the first and second laterally-spaced, vertically-oriented base plates are each configured to be attachable to a rail that is attachable to, or is a part of, a ladder.

Embodiment 21 is a vertical climbing fall protection system comprising the top bracket of any of embodiments 16-20 and further comprising a safety cable whose upper end is detachably connected to the top bracket, wherein the safety cable comprises an at least generally T-shaped fitting at an upper end of the safety cable, which T-shaped fitting comprises a horizontally-oriented major crossbar that is seated on an upper major surface of a valley floor of a forward floor panel of the top bracket so as to detachably connect the upper end of the safety cable to the top bracket.

Embodiment 22 is the vertical climbing fall protection system of embodiment 21, wherein the T-shaped fitting of the upper end of the safety cable further comprises a horizontally-oriented minor crossbar that is positioned vertically below the major crossbar and that lies below a lowermost point of the forward floor panel of the top bracket when the major crossbar is seated on the upper major surface of the valley floor of the forward floor panel.

Embodiment 23 is the vertical climbing fall protection system of embodiment 22 wherein when the major crossbar is seated on the upper major surface of the valley floor of the forward floor panel, the major crossbar and the minor crossbar are both oriented at least generally parallel to the forward-rearward axis of the top bracket.

Embodiment 24 is a vertical climbing fall protection system comprising the top bracket of any of embodiments 1-15 and further comprising a safety cable whose upper end is detachably connected to the top bracket.

Embodiment 25 is the vertical climbing fall protection system of embodiment 24, further comprising a bottom bracket to which a lower end of the safety cable is connected.

Embodiment 26 is the vertical climbing fall protection system of any of embodiments 24-25, further comprising a cable sleeve that is configured to be attached to a harness of a worker by way of a connection that includes at least one shock absorber, wherein the cable sleeve is configured to travel along the safety cable as the worker climbs.

Embodiment 27 is the vertical climbing fall protection system of any of embodiments 24-26, further comprising a rail to which the first and second base plates are attached.

Embodiment 28 is a top bracket comprising first and second laterally-spaced plates and comprising a floor panel that connects at least a part of a lowermost portion of the first plate with at least a part of a lowermost portion of the second plate, wherein the first plate comprises a slot that is at least generally T-shaped when viewed along a lateral axis of the top bracket; and, wherein the floor panel comprises a complementary slot that originates from a lowermost end of a vertical trunk of the T-shaped slot of the first plate, and wherein the complementary slot of the floor panel extends across a lateral extent of the floor panel and terminates proximate a lowermost edge of the second plate, and wherein the T-shaped slot is configured to allow a major crossbar and a portion of a vertical trunk of an at least generally T-shaped fitting of an upper end of a safety cable to pass laterally through the T-shaped opening so that the major crossbar of the T-shaped fitting of the safety cable can be seated on a floor of a concave-upward valley defined by the floor panel.

Embodiment 29 is a top bracket for supporting a safety cable of a vertical climbing fall protection system, the bracket exhibiting a vertical axis, a horizontally-oriented forward-rearward axis, and a horizontally-oriented lateral axis, and the bracket comprising: at least one vertically-oriented base plate; at least one vertically-oriented, pivotally deflectable plate that is configured to allow an upper end of a safety cable to be connected thereto; wherein the at least one pivotally deflectable plate is integrally and pivotally connected to the at least one base plate by a vertically-oriented neck configured so that the pivotally deflectable plate extends at least generally forwardly from the base plate and so that the pivotally deflectable plate comprises an axis of pivotal deflection that passes through the neck and that is oriented at least generally parallel to the lateral axis of the top bracket, and, wherein the top bracket further comprises a vertically-oriented abutment plate that extends forwardly from a lower section of the base plate and that comprises a forward abutment surface that is separated from a rearward abutment surface of the pivotally deflectable plate by an elongate gap.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter.

What is claimed is:

1. A top bracket for a vertical climbing fall protection system, the bracket exhibiting a vertical axis, a horizontally-oriented forward-rearward axis, and a horizontally-oriented lateral axis, and the bracket comprising:

at least one vertically-oriented base plate;

at least one vertically-oriented, pivotally deflectable plate that is configured to allow an upper end of a safety cable to be connected thereto;

wherein the at least one pivotally deflectable plate is integrally and pivotally connected to the at least one base plate by a vertically-oriented neck configured so that the pivotally deflectable plate extends at least generally forwardly from the base plate and so that the pivotally deflectable plate comprises an axis of pivotal deflection that passes through the neck and that is oriented at least generally parallel to the lateral axis of the top bracket;

wherein the top bracket further comprises a vertically-oriented abutment plate that extends forwardly from a lower section of the base plate and that comprises a forward abutment surface that is separated from a rearward abutment surface of the pivotally deflectable plate by an elongate gaps;

wherein the top bracket is configured to be attached to a secure support so that an upper end of a safety cable can be connected to the top bracket so that the top bracket supports the safety cable;

and, wherein the abutment plate is positioned generally below, and rearward, of the pivotally deflectable plate and wherein the pivotally deflectable plate and the abutment plate are configured so that a sufficient downward force transmitted by the safety cable to the pivotally deflectable plate causes the pivotally deflectable plate to pivotally deflect generally downwardly and rearwardly into a deflected condition in which a width of the elongate gap between the rearward abutment surface of the pivotally deflectable plate and the forward abutment surface of the abutment plate is narrowed.

2. The top bracket of claim 1 wherein the pivotally deflectable plate and the neck are portions of a single, unitary body.

3. The top bracket of claim 2 wherein the base plate and the abutment plate are portions of the single, unitary body.

4. The top bracket of claim 3 wherein the base plate, the pivotally deflectable plate, the neck, and the abutment plate, are all portions of a single, unitary, integral steel body.

5. The top bracket of claim 1 wherein the elongate gap exhibits a long axis that, over at least 70% of an elongate length of the elongate gap, is oriented within 10 to 50 degrees of the vertical axis of the top bracket.

6. The top bracket of claim 1 wherein a portion of a lower edge of the neck defines at least a portion of an upper edge of a rear end of the elongate gap.

7. The top bracket of claim 1 wherein the elongate gap exhibits a gap width that is at least substantially uniform over at least 80% of an elongate length of the elongate gap.

8. The top bracket of claim 7 wherein the elongate gap comprises a rear end that takes the form of an at least generally circular lower aperture, which lower aperture exhibits a diameter that is greater than an average gap width of the elongate gap by a factor of at least abut 1.8.

9. The top bracket of claim 1 wherein an upper edge of the neck comprises a lowermost point that is located lower than an uppermost point of the pivotally deflectable plate.

10. The top bracket of claim 9 wherein at least a portion of the upper edge of the neck comprises an arcuate shape that provides a portion of an at least generally circular upper aperture.

11. The top bracket of claim 1 wherein a minimum vertical height of the neck is no greater than 30% of a maximum vertical height of the pivotally deflectable plate.

12. The top bracket of claim 1 wherein a minimum vertical height of the neck is no greater than 20% of a maximum vertical height of the pivotally deflectable plate.

13. The top bracket of claim 1 wherein the pivotally deflectable plate is a cantilevered plate that is not supported by any entity other than the neck.

14. The top bracket of claim 1 wherein the top bracket is equipped with one or more sensors that can monitor a width of the elongate gap.

15. The top bracket of claim 1 wherein the top bracket is equipped with one or more sensors that can monitor any deflection of the pivotally deflectable plate and can transmit an indication of the deflection of the pivotally deflectable plate to a remote unit.

16. A vertical climbing fall protection system comprising the top bracket of claim 1 and further comprising a safety cable whose upper end is detachably connected to the top bracket.

17. The vertical climbing fall protection system of claim 16, further comprising a bottom bracket to which a lower end of the safety cable is connected.

18. The vertical climbing fall protection system of claim 17, further comprising a cable sleeve that is configured to be attached to a harness of a worker by way of a connection that includes at least one shock absorber, wherein the cable sleeve is configured to travel along the safety cable as the worker climbs.

19. The vertical climbing fall protection system of claim 16, wherein the top bracket is attached to a secure support.

* * * * *